US012755614B2

(12) United States Patent
Ragnoni et al.

(10) Patent No.: US 12,755,614 B2
(45) **Date of Patent: *Oct. 6, 2026**

(54) DEMATERIALIZED INSTANT LOTTERY TICKET SYSTEM AND METHOD

(71) Applicant: Brightstar Global Solutions Corporation, Providence, RI (US)

(72) Inventors: Gianluca Ragnoni, Rome (IT); Emanuele Martire, Rome (IT); Veniero Merlini, Rome (IT); Fabrizio Battini, Rome (IT); Giuseppe Bianchi, Rome (IT)

(73) Assignee: Brightstar Global Solutions Corporation, Providence, RI (US)

( * ) Notice: Subject to any disclaimer, the term of this patent is extended or adjusted under 35 U.S.C. 154(b) by 60 days.

This patent is subject to a terminal disclaimer.

(21) Appl. No.: 18/467,198

(22) Filed: Sep. 14, 2023

(65) Prior Publication Data

US 2024/0005748 A1 Jan. 4, 2024

Related U.S. Application Data

(63) Continuation of application No. 17/374,293, filed on Jul. 13, 2021, now Pat. No. 11,798,377.

(60) Provisional application No. 63/059,337, filed on Jul. 31, 2020.

(51) Int. Cl.
*G07F 17/32* (2006.01)
*G06Q 50/34* (2012.01)

(52) U.S. Cl.
CPC ........... *G07F 17/329* (2013.01); *G06Q 50/34* (2013.01)

(58) Field of Classification Search
CPC .............................. G06Q 50/34; G07F 17/329
See application file for complete search history.

(56) References Cited

U.S. PATENT DOCUMENTS

| | | | |
|---|---|---|---|
| 4,398,708 | A | 8/1983 | Goldman et al. |
| 6,685,562 | B1 | 2/2004 | Rantanen |
| 6,875,105 | B1 | 4/2005 | Behm et al. |
| 7,373,484 | B1 | 5/2008 | Radhakrishnan et al. |
| 8,043,154 | B2 | 10/2011 | Bennett |
| 8,398,484 | B2 | 3/2013 | Wright et al. |

(Continued)

OTHER PUBLICATIONS

"Combined Search Report and Abbreviated Examination Report", from corresponding Great Britain Patent Application No. GB2110697.6, Jan. 11, 2022.

(Continued)

*Primary Examiner* — Robert E Mosser
(74) *Attorney, Agent, or Firm* — Neal, Gerber & Eisenberg LLP

(57) ABSTRACT

A system and method for facilitating an instant lottery game with both physical and virtual instant lottery tickets, and more particularly to a system and method for facilitating virtual instant lottery ticket creation, virtual instant lottery ticket selling, virtual instant lottery ticket transferring, virtual instant lottery ticket scratching, and virtual instant lottery ticket redemption. The instant lottery ticket system and method of various embodiments provides the seamless integration with existing physical instant lottery game and ticket systems (and processes thereof), substantially the same overall player experience as provided with physical instant lottery tickets.

19 Claims, 9 Drawing Sheets

(56) References Cited

U.S. PATENT DOCUMENTS

| | | | |
|---|---|---|---|
| 9,934,652 | B2 | 4/2018 | Gaddy |
| 2004/0056416 | A1 | 3/2004 | Bennett |
| 2009/0253482 | A1 | 10/2009 | Honour |
| 2010/0069136 | A1 | 3/2010 | Safaei et al. |
| 2011/0105213 | A1* | 5/2011 | Irwin, Jr. ............ G07F 17/3241 101/483 |
| 2012/0202574 | A1 | 8/2012 | Stanek et al. |
| 2017/0294074 | A1 | 10/2017 | Lovell |
| 2019/0259239 | A1 | 8/2019 | Barnes |
| 2019/0272704 | A1 | 9/2019 | Lemay et al. |
| 2019/0280875 | A1 | 9/2019 | Ragnoni et al. |
| 2020/0193764 | A1 | 6/2020 | Ovalle |
| 2021/0074120 | A1 | 3/2021 | Ragnoni et al. |

OTHER PUBLICATIONS

"International Standard ISO/IEC 18033-2", Information technology—Security techniques—Encryption algorithms; Part 2: Asymmetric ciphers; ISO/IEC 2006.

"Standards for Efficient Cryptography 1 (SEC 1)", Certicom Research, Version 2.0, May 21, 2009.

* cited by examiner

DEMATERIALIZED INSTANT LOTTERY TICKET SYSTEM AND METHOD

PRIORITY CLAIM

This application is a continuation of, claims priority to and the benefit of U.S. Non-Provisional patent application Ser. No. 17/374,293 filed Jul. 13, 2021, which application claims priority to and the benefit of U.S. Provisional Patent Application No. 63/059,337, filed Jul. 31, 2020, the entire contents of which are incorporated herein by reference.

BACKGROUND

The present disclosure relates to virtual instant lottery tickets, and more particularly to virtual instant lottery ticket creation, selling, transferring, verification, and redemption systems and methods that facilitate virtual instant lottery tickets for instant lottery games that may or may not also include physical instant lottery tickets.

One type of a physical instant lottery ticket of an instant lottery game may include a substrate with variable indicia on the substrate and a scratch-off coating ("SOC") covering the variable indicia. The variable indicia may be letters, numbers, symbols, images, or other indicia that indicate whether the physical instant lottery ticket is a winning lottery ticket or not. The variable indicia of the physical instant lottery ticket may indicate one or more awards according to a predetermined award structure for the instant lottery game. The award structure for such instant lottery game may, for example, include one or more instant lottery tickets associated with large value awards, one or more instant lottery tickets associated with lesser value awards, and one or more instant lottery tickets that are not associated with any awards. The purpose of the SOC is to ensure that the variable indicia cannot be read or otherwise determined without first removing the SOC, thereby assisting in ensuring that the instant lottery ticket is secure against fraudulent activity such as a person picking out winning instant lottery tickets from packs of unsold instant lottery tickets. The holder (such as the player) of the instant lottery ticket may scratch off the SOC to reveal the variable indicia and to determine if the instant lottery ticket is a winning ticket. By removing this SOC, the holder of the instant lottery ticket can instantly determine if the instant lottery ticket is a winning ticket instead of waiting for a future drawing. These types of instant lottery tickets are often referred to as scratch-off tickets and these types of lottery games are often referred to as scratch-off lottery games or scratch-off games.

BRIEF SUMMARY

In various embodiments, the present disclosure relates to a lottery ticket system including a virtual instant ticket factory system operable to create a digital object representing a virtual instant lottery ticket for an instant lottery game, a virtual coating key factory system operable to provide an encryption key for a virtual scratch-off-coating for the digital object, a lottery owner system operable to issue the digital object, and a notary system operable to track and apply digital signatures to the digital object.

In various embodiments, the present disclosure relates to a lottery ticket system including a virtual instant ticket factory system operable to create a virtual instant lottery ticket for an instant lottery game, and a virtual coating key factory system operable to provide an encryption key for a virtual scratch-off-coating for the virtual instant lottery ticket. The lottery ticket system further includes a lottery owner system operable to: (i) receive a request from a device (such as a lottery player device or terminal retailer device) requesting to purchase the virtual instant lottery ticket, (ii) issue the virtual instant lottery ticket to the lottery player device, (iii) receive a scratch off request for the virtual instant lottery ticket from the lottery player device, (iv) responsive to such request cause the virtual coating key factory system to remove the virtual scratch-off-coating from the virtual instant lottery ticket, and (v) facilitate redemption of the virtual instant lottery ticket for any award associated with the virtual instant lottery ticket.

In various embodiments, the present disclosure relates to a lottery ticket system including a virtual instant ticket factory system operable to create a digital object representing a virtual instant lottery ticket for an instant lottery game, and a virtual coating key factory system separate and independent from the virtual instant ticket factory system and operable to provide an encryption key for a virtual scratch-off-coating for the digital object. The lottery ticket system further includes a lottery owner system separate and independent from the virtual instant ticket factory system and the virtual coating key factory system, and operable to receive a scratch off request for the digital object from a lottery player device, and responsive to such request, operate with the virtual coating key factory system to remove the virtual scratch-off-coating from the digital object.

Additional features are described in, and will be apparent from, the following Detailed Description and the figures.

DETAILED DESCRIPTION

Figure 1:
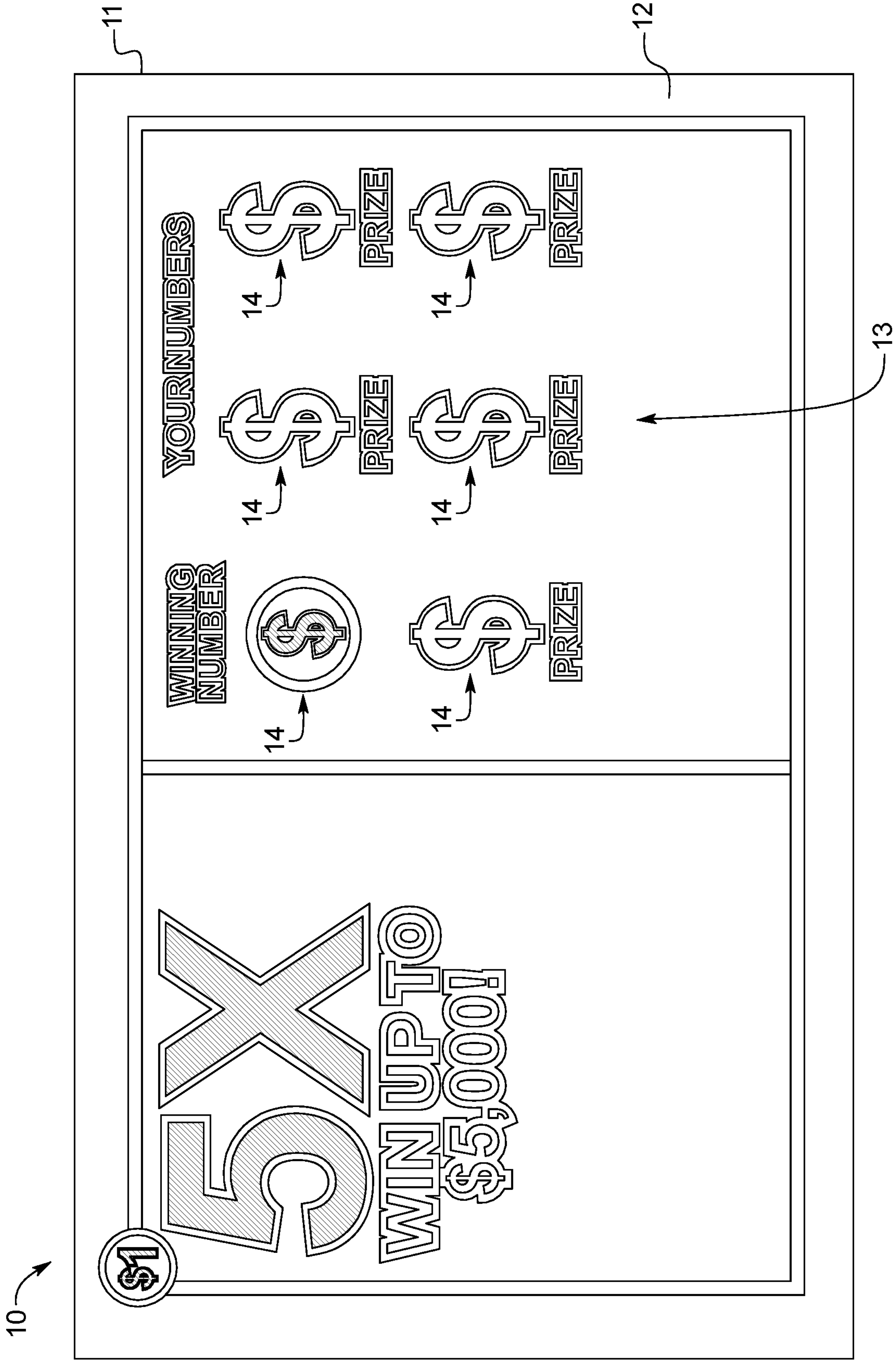
FIG. 1 is a front view of an example physical instant lottery ticket with a scratch-off-coating.

In various embodiments, the present disclosure relates generally to a system and method for facilitating an instant lottery game with both physical and virtual instant lottery tickets, and more particularly to a system and method for facilitating virtual instant lottery ticket creation, virtual instant lottery ticket selling, virtual instant lottery ticket transferring, virtual instant lottery ticket scratching, and virtual instant lottery ticket redemption. The system and method of the present disclosure enables the virtual instant lottery tickets of an instant lottery game to function like the physical instant lottery tickets of that same instant lottery game, and thus enables the same instant lottery game to be played using both physical and virtual instant lottery tickets. The system and method of the present disclosure can alternatively be employed to provide virtual instant lottery tickets of an instant lottery game that only includes virtual instant lottery tickets (and not physical lottery tickets). The instant lottery ticket system and method of various embodiments of the present disclosure provides: (1) the seamless integration with existing physical instant lottery game and ticket systems (and processes thereof); (2) substantially the same overall player experience as provided with physical instant lottery tickets; and (3) improved security and protection against fraudulent activity, as further described below.

The following general information regarding instant lottery tickets, instant lottery games, and instant lottery game systems and methods is provided for a better understanding the virtual instant lottery tickets, the instant lottery games, and the instant lottery game systems and methods of the present disclosure.

As mentioned above, various physical instant lottery tickets include a substrate with variable indicia on the substrate and a scratch-off coating ("SOC") covering the variable indicia. This variable indicia indicates any awards associated with the physical instant lottery ticket and is concealed under the SOC. The SOC prevents the variable indicia from being read or otherwise determined without the SOC being first removed. The SOC is thus one feature that is used to secure the physical instant lottery ticket against an unauthorized person determining the variable indicia and picking out winning instant lottery tickets from instant lottery ticket packs (or extracting other confidential information from unsold instant lottery tickets). By removing the SOC, an authorized player of the physical instant lottery ticket can instantly determine if the physical instant lottery ticket is a winning ticket. If the SOC is removed, this removal generally indicates that a player has already played the physical instant lottery ticket or that the physical instant lottery ticket has been tampered with. The authorized player is either: (1) a person who purchased the instant lottery ticket, or (2) a person who receives the instant lottery ticket from a person who purchased the instant lottery ticket, and will generally be referred to herein as the player. Billions of scratch-off instant lottery tickets of this type are created and sold every year around the world.

Various known instant lottery tickets are single game lottery tickets. One example single game instant lottery ticket is illustrated in FIG. 1A. This example single game instant lottery ticket 10 includes: (1) a ticket substrate 11 having a front surface 12; (2) a predefined scratch-off area 13 defined on the front surface 12; and (3) a plurality of SOC areas 14 covering variable indicia (not shown) on the front surface 12 of the substrate 11 in the predefined scratch-off area 13. Although not shown, the front surface 12 or the back surface (not shown or labeled) of the ticket substrate 11 may include: (a) various additional static indicia such as game information, and/or (b) variable lottery ticket information indicia, such as but not limited to text, one or more ticket numbers, one or more ticket barcodes, and other instant lottery ticket information that is either or both human readable and/or machine readable. Certain of this information can identify the instant lottery ticket, the set of the instant lottery ticket, the run of the instant lottery ticket, and/or the group of instant lottery tickets that the instant lottery ticket is part of, and may provide other inventory control, verification, validation, and/or redemption information. Such instant lottery tickets can include multiple predefined scratch-off areas, multiple sets of variable indicia printed on the predefined scratch-off areas, and multiple scratch-off coatings covering the sets of variable indicia. Various known instant lottery tickets are multiple game lottery tickets, and include multiple instant lottery games. For the purposes of this disclosure, the instant lottery tickets of the present disclosure are described as single game instant lottery tickets for brevity, but it should appreciated that the present disclosure can also provide multiple game instant lottery tickets.

Instant lottery ticket manufacturers often create instant lottery games that include multiple pools where each pool has an award structure. Each pool is divided into multiple packs of physical instant lottery tickets where each pack contains a preset quantity of instant lottery tickets. For example, an instant lottery game may include 2,000,000 instant lottery tickets divided into 10 pools where: (a) each pool contains 200,000 of the instant lottery tickets, (b) each pool contains 1000 packs, and (c) each pack contains 200 of the instant lottery tickets. It should be appreciated that instant lottery games can be organized in different ways and can include sets of packs not grouped into pools. Each individual pack of instant lottery tickets (which are sometimes called books), is packaged by the manufacturer for delivery to a lottery administration or a lottery sales agent (such as a retail lottery sales agent that receives one or more packaged packs of instant lottery tickets, opens the packaged pack(s), and sells the individual instant lottery tickets of the pack(s) to players).

The terms "image" or "ticket image" is sometimes used by lottery ticket manufacturers and herein to collectively indicate some or all of the variable indicia (including the variable indicia that indicates any awards and the variable indicia that indicates validation numbers or other variable information) of a physical instant lottery ticket. This image for each instant lottery ticket is placed on that instant lottery ticket during manufacture of that instant lottery ticket. The image may or may not include the common graphics on all of the instant lottery tickets of an instant lottery game that indicate information like the name or features of that instant lottery game.

For certain physical instant lottery tickets, as part of the manufacturing process, each instant lottery ticket is formed with an image that also indicates ticket identification data such as: (a) the instant lottery game number, (b) the ticket number, and (c) the pack number. The image may also indicate: (i) the ticket validation number, and (ii) the barcode. The barcode typically represents both the inventory information (such as the pack number) and the validation number (and is often on the back surface of the substrate of the physical instant lottery ticket). The data for each instant lottery ticket, including the ticket identification data, the variable indicia data, the validation number data, and the barcode data, is generated by one or more programed computers of the instant lottery game system. During the manufacturing process, for each physical instant lottery ticket of an instant lottery game, all of this variable indicia representing this data is placed on the substrate of that instant lottery ticket and subsequently covered by the SOC.

For these types of physical instant lottery tickets, one function of the validation number is to reduce fraudulent redemptions where the instant lottery ticket has been fraudulently altered. The validation number of a physical instant lottery ticket is typically an encrypted number that serves to uniquely identify that instant lottery ticket, and therefore the other data related to that particular instant lottery ticket so that the lottery system can determine if, in fact, that particular instant lottery ticket is a winning ticket when a holder (such as a player) of that instant lottery ticket tries to redeem that instant lottery ticket for an award. This instant lottery ticket manufacturing method is sometimes called the single pass security method where there is a defined relationship between the ticket identification data and the validation number data on each instant lottery ticket. This relationship may algorithmic or may be in a set of files that associate the ticket identification data with the validation number data for each of the instant lottery tickets of an instant lottery game. This single pass security method determines any award associated with each instant lottery ticket submitted for redemption based on either: (1) the ticket identification data, or (2) the validation number.

Since the award value of each instant lottery ticket is determined prior to the time of manufacture of that instant lottery ticket, there is a continuing need for the instant lottery tickets to be manufactured with extraordinary security precautions to try to prevent fraudulent activity. In particular, from the manufacturer's point of view, one of the significant security risks is from potential insider fraudulent activity. For example, an employee of the manufacturer that has access to the programed computer of the instant lottery game system may improperly determine the relevant ticket identification numbers for the instant lottery tickets associated with very large wins, and then access the instant lottery ticket shipment/logistics database of the instant lottery game system to determine which instant lottery ticket seller(s)) such large award lottery ticket(s) has/have been or will be delivered to, and take steps to acquire those instant lottery ticket(s). In another example, an employee of the manufacturer may try to obtain the winning instant lottery ticket from the pack that such ticket is in prior to delivery to a lottery ticket seller.

To combat these and other potential fraudulent activities, manufacturers of physical instant lottery tickets have employed various security systems and methods.

For example, to improve security, one manufacturing method that has been employed is sometimes called the dual security method. This method has been used to hide (such as by eliminating) the relationship between the ticket identification data and the validation number data. Using this method, the ticket identification data on each instant lottery ticket (specifically including the pack number) cannot be used to determine if any award (such as a large award) is associated with that instant lottery ticket; however, the validation number data on each instant lottery ticket can still be used to determine any award associated with that instant lottery ticket. Lottery tickets made using this method have a pack number on each of the instant lottery tickets that is different than the pack number originally assigned by the programmed computer of the instant lottery ticket system that used in the instant lottery ticket creation process. This security process is configured to irreversibly break the relationship between the pack number and the validation number on each instant lottery ticket. Thus, knowledge of the results of the programmed computer cannot be improperly used by someone having access to that information to select winning instant lottery tickets before those instant lottery tickets are sold.

One dual security method includes employing a shuffling routine using a shuffle key as an input variable to independently shuffle the pack numbers in a pool after they are computer generated by the lottery ticket system. The result is a set of pack numbers on the instant lottery tickets that are unknown to those having access to the programmed computer of the instant lottery game system. In this approach, the shuffle keys are not recorded or maintained by the manufacturer's programming staff and as a result, the dual security is essentially irreversible. The possibility of anyone on either the manufacturer's or the lottery administration's staff being able to illicitly identify the winning instant lottery tickets by using the pack and/or ticket numbers on the instant lottery tickets is thus substantially reduced.

Figure 2:
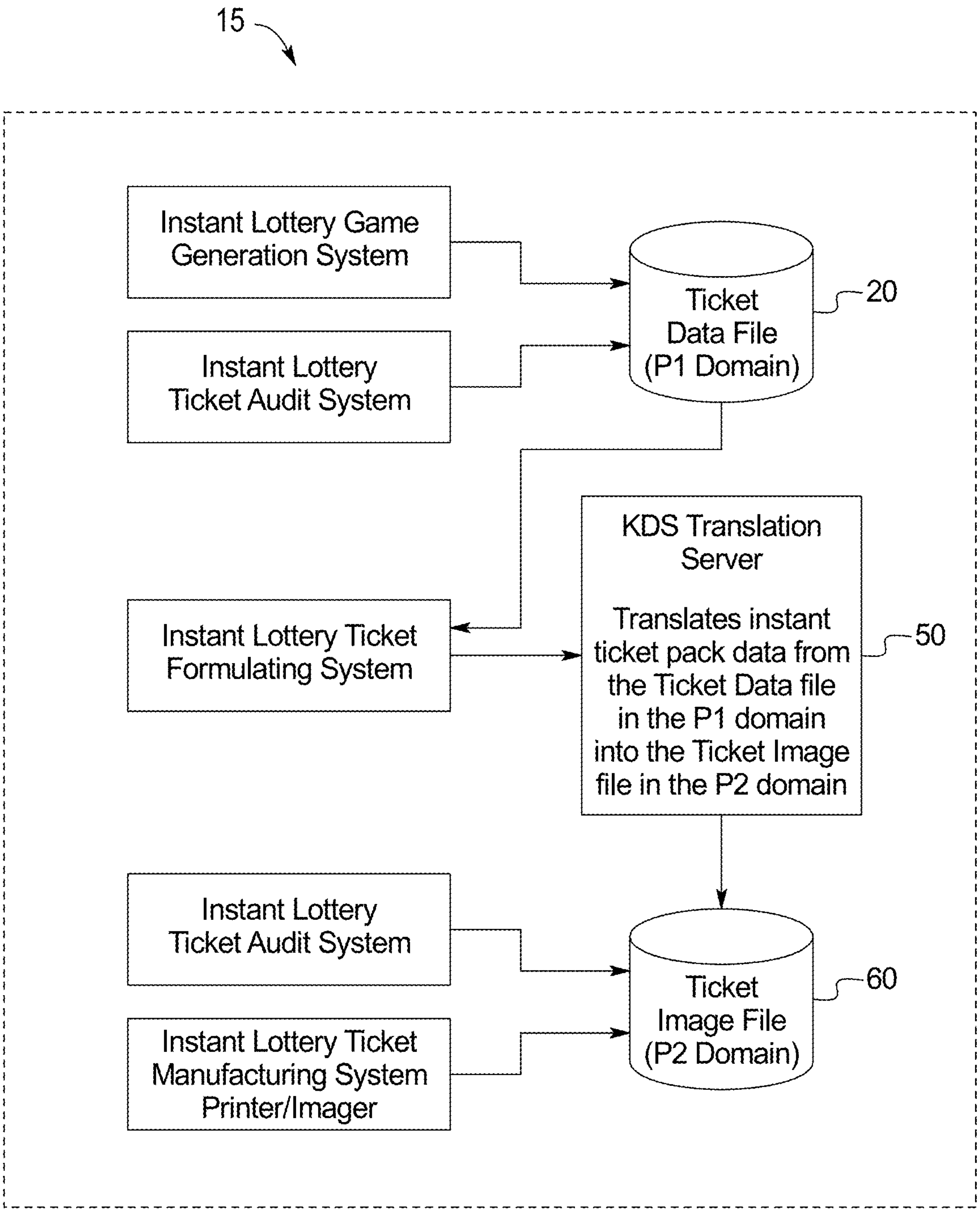
FIG. 2 PRIOR ART
FIG. 2 is a schematic diagram of a known physical instant lottery game system.

A further enhancement to the dual security method has been called the keyed dual security method ("KDS"). The KDS method decouples the index used to manage each instant lottery ticket as "data" from the index used to manage the same instant lottery ticket as "image" (as image is described above). As shown in FIG. 2, the instant lottery game system 15 employs a KDS method that splits certain operations into two domains that are labeled the P1 Domain 20 and the P2 Domain 60. The P1 Domain implements all of the software, processes, and audits to manage, control, and certify the proper generation of the instant lottery game and the relevant award structure.

The P1 Domain 20 thus manages the instant lottery tickets as "data" information. The P2 Domain 60 manages the instant lottery tickets as "image" information, and handles all the manufacturing processes (including any printing and coating processes) as well as the logistics and shipping processes. The KDS method decouples these two domains by using two different ticket indexing mechanisms in the two domains, so that the ticket identifiers used while managing the instant lottery tickets as data (and hence while generating the instant lottery ticket awards) are unlinkable to the identifiers used while manufacturing and shipping the physical instant lottery tickets themselves.

For an instant lottery ticket system employing the KDS method, there are practical important emergency situations where the relation between the P1 Domain and the P2 Domain ticket indices must be necessarily disclosed. For instance, such disclosure is required when due to one or more failures in the printing or shipping processes, it becomes necessary to backtrack the shipment of the physical instant lottery tickets and restore the equity of the instant lottery game (e.g., such as when a misprinted instant lottery ticket is the one containing a major award for the instant lottery game). For this reason, the mapping between such indices cannot be implemented as a one-way, irreversible, shuffling, but must be reversible (e.g., it must be obtained as a secret and secure keyed pseudo random permutation of the original instant lottery ticket identification numbers.) In practice, this permutation may have a non-straightforward format-preserving structure, as the ticket numbering/indexing configuration can be organized into a complex hierarchical structure. In other words, an instant lottery game may, for example, be formed using pools, each with a given award structure, and one or more of the pools may be in turn divided into lots (further including multiple packs) to ease shipment and quality control. For the present disclosure, the specific structure of such a permutation is not pertinent. Rather, for the present disclosure, it should be appreciated that the actual secure pseudo random permutation (also sometimes referred to as shuffling) may have to be managed by an independent trusted third party system. In FIG. 2, the trusted third party system is referred to as KDS translator server 50 that enforces the ticket indices permutation and securely stores the permutation key so as to enable reversion of a subset of ticket indices, if and when needed.

While there is growing interest in the virtualization of instant lottery games, the security issues become further complicated for instant lottery ticket games that employ virtual instant lottery tickets, and even more complicated for instant lottery ticket games that employ the combination of both physical instant lottery tickets and virtual instant lottery tickets for the same instant lottery ticket game.

Various embodiments of the present disclosure provide secure instant lottery game systems and methods that provide instant lottery games that employ virtual instant lottery tickets, and for instant lottery games that employ both physical instant lottery tickets and virtual instant lottery tickets. Despite being configured for seamless integration with a physical ticket manufacturing process, various embodiments of the present disclosure endeavor to provide virtual instant lottery tickets that are even more secure than physical instant lottery tickets for the same instant lottery game.

An instant lottery game that employs virtual instant lottery tickets of the present disclosure may sometimes be referred to herein as (or may be considered to be) a dematerialized instant lottery game. A virtual instant lottery ticket of the present disclosure may sometimes be referred to herein as (or may be considered to be) a dematerialized instant lottery ticket. The terms dematerialized or dematerialization are used herein to stress that one issue solved by various embodiments of the present disclosure is broader than just providing an online version of an instant lottery game. Rather, various embodiments of the system and method of the present disclosure provide an instant lottery game that mimics certain physical processes and specifically provides an instant lottery ticket that can be: (1) individually selectable among a pack of available virtual instant lottery tickets (such as on a virtual shop shelf); (2) bought and transferred as a digital object to a player device; (3) transferred from that first player device to another or second player device (such as when the player (e.g., owner) of that first player device gifts the virtual instant lottery ticket to the player (e.g., owner) of that second player device); and (4) scratchable and redeemable at any arbitrary later time, all with strict guarantees on the anonymity of each such player, exactly as in the case of a physical instant lottery ticket.

It should be appreciated that various embodiments of the present disclosure relate to instant lottery game systems and methods that provide manufacturing and tracking processes that are backward compatible with the physical instant lottery ticket manufacturing processes (e.g., the virtual part of the instant lottery game becomes a branch of an already existing physical instant lottery game rather than a brand new lottery game, or that is a branch of an brand new lottery game).

It should also be appreciated that certain embodiments of the present disclosure relate to instant ticket lottery game systems and methods that employ various secure processes including but not limited to what is referred to herein as a secret envelope method (described below) that enables dematerialization of and distribution of such dematerialized instant lottery tickets. In certain such embodiments as further described below, the secret envelope method may include creating a multi-layered encrypted version of a virtual instant lottery ticket, and dividing the information necessary to decrypt between different actors in the process to avoid a single actor having all of the information needed.

Figure 3:
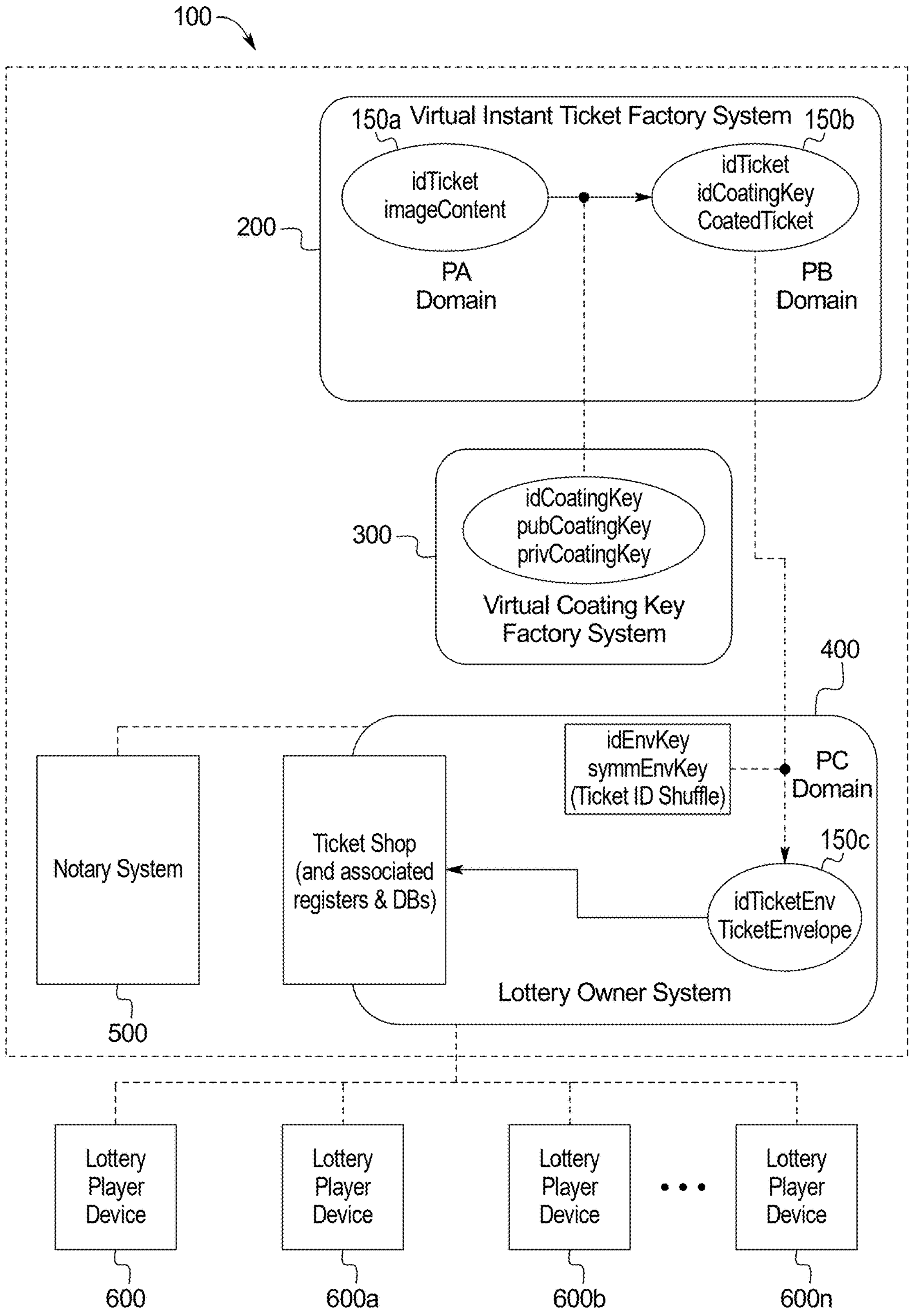
FIG. 3 is a schematic diagram of a virtual instant lottery game system of one example embodiment of the present disclosure, and which includes a virtual instant ticket factory system, a virtual coating key factor system, a lottery owner system, and a notary system, configured to co-act with a plurality of lottery player devices.

More specifically, turning now to FIG. 3, one example embodiment of an instant lottery game system of the present disclosure is generally shown and indicated by numeral 100. This example instant lottery game system 100 generally includes: (1) a virtual instant ticket factory system 200; (2) a virtual coating key factory system 300; (3) a lottery owner system 400; and (4) a notary system 500, configured to co-act to enable a plurality of players to play an instant lottery game including a plurality of virtual instant lottery tickets (not shown in FIG. 3) via a plurality of lottery player devices such as lottery player devices 600, 600*a*, 600*b*, . . . 600*n*. Any suitable quantity of players via respective player devices may play the instant lottery game provided by the present disclosure. This example system facilitates an instant lottery game with both physical and virtual instant lottery tickets, and more particularly facilitates instant lottery ticket creation, virtual instant lottery ticket selling, virtual instant lottery ticket transferring, virtual instant lottery ticket scratching, and virtual instant lottery ticket redemption. This example system provides virtual instant lottery tickets of an instant lottery game that function like the physical instant lottery tickets of that same instant lottery game. This example system can alternatively be employed to provide virtual instant lottery tickets of an instant lottery game that only includes virtual instant lottery tickets (and not physical lottery tickets).

It should be appreciated that for purposes of the present disclosure, one virtual instant lottery ticket of one instant lottery game and one lottery player device 600 are generally used herein for explanation purposes and for brevity; however, it should be appreciated that such explanations apply to each of the plurality of virtual instant lottery tickets of each of a plurality of instant lottery games and that such explanations apply to each of the lottery player devices (that are sometimes referred to herein as player devices).

In various embodiments of the present disclosure, each of: (1) the virtual instant ticket factory system 200; (2) the virtual coating key factory system 300; (3) the lottery owner system 400; (4) the notary system 500; (5) the lottery player devices 600, 600*a*, 600*b*, . . . 600*n*, includes one or more processors (not shown) and one or more memory devices (not shown) that store a plurality of instructions (not shown) that are executable by the one or more processors, and that when executed cause the one or more processors to perform the functions described herein for each respective system or device. It should thus be appreciated that these systems and devices are configured to or operable to perform the various respective functions described herein via the execution by the respective processors of the respective instructions. It should also be appreciated that for brevity, various of the functions of each of the systems and devices are described herein as the respective system or device performing such function without referencing the processor, memory devices, or instructions that enable such system or device to perform such functions.

In various embodiments of the present disclosure, each of: (1) the virtual instant ticket factory system 200; (2) the virtual coating key factory system 300; (3) the lottery owner system 400; (4) the notary system 500; (5) the lottery player devices 600, 600_a_, 600_b_, . . . 600_n_, includes one or more display devices (not shown) and one or more input devices (not shown) that are in communication with and/or controlled by the respective processors, and that enable respective users such as operators and players of such systems and devices to make inputs to and see displays or interfaces provided by such devices for operational and other control or uses of such systems and devices. It should also be appreciated that for brevity, various of the functions of each of the systems and devices with respect such display and input devices are described herein as the respective system or device performing such function without referencing such display and/or input devices as performing such functions.

In various embodiments of the present disclosure, each of: (1) the virtual instant ticket factory system 200; (2) the virtual coating key factory system 300; (3) the lottery owner system 400; (4) the notary system 500; (5) the lottery player devices 600, 600_a_, 600_b_, . . . 600_n_, are in different physical locations and respectively controlled by different independent entities, but it should be appreciated that in certain embodiments of the present disclosure two or more sets of such systems can be situated at a same physical location.

It should be appreciated that for describing this example system 100 of the present disclosure, each virtual instant lottery ticket that is created, available for sale, sold via a purchase (such as a placement of a wager on the ticket), transferred, scratched, and/or redeemed (for any associated award(s)) is in the form of what is referred to herein as a digital object. At each point in the creation, selling, transferring, scratching, and redemption processes, the digital object for each virtual instant lottery ticket includes a set of data that changes with each of the plurality of different steps in the processes performed by the respective systems and devices 200, 300, 400, 500 and 600, as further described herein. The digital object representing a virtual instant lottery ticket is generally indicated by numeral 150 for brevity regardless of the set of different data that the digital object includes at each point in the process. The digital object for the virtual instant lottery ticket at various points in the process is also indicated by respective numerals 150_a_, 150_b_, 150_c_, 150_d_, 150_e_, 150_f_, 150_g_, 150_h_, 150_i_, 150_j_, 150_k_, 150_l_, and 150_m_ based on the respective set of different data that the digital object includes at each respective point in the process as generally illustrated in FIGS. 3, 4, 5, 6, 7A, 7B, and 8. It should also be appreciated that the digital object can be transmitted as discussed herein as part of a data package or bundle.

Generally, the example virtual instant ticket factory system 200 of the example system 100 is operable to: (1) create a virtual instant lottery ticket for an instant lottery game (which includes creating a digital object representing the virtual instant lottery ticket); (2) create a digital signature tag for the digital object; and (3) apply a virtual scratch off coating to the digital object representing the virtual instant lottery ticket using a public coating key (or keys) provided by virtual coating key factory system 300.

Generally, the example virtual coating key factory system 300 of the example system 100 is operable to: (1) create a public coating key (or keys); and (2) upon an authorized request, remove the virtual scratch-off-coating from the virtual instant lottery ticket (and particularly from the digital object).

Generally, in certain embodiments, the example lottery owner system 400 of the example system 100 is operable to: (1) create and apply an envelope to the virtual instant lottery ticket (and particularly to the digital object) during the creation process. The lottery owner system 400 is also operable to orchestrate all of the transactions for the virtual instant lottery ticket (and particularly the digital object) including, but not limited to: (2) interfacing with each of the lottery player devices for each request relating to one of the virtual instant lottery tickets (and particularly the digital object); (3) interfacing with the notary system 500 for each request relating to the virtual instant lottery ticket (and particularly the digital object); (4) responsive to such request, initially issuing the virtual instant lottery ticket (and particularly the digital object) to the requesting player device 600; (5) receiving each transfer request for the virtual instant lottery ticket (and particularly the digital object) and facilitating the transfer (although it should be appreciated that in other embodiments the transfer could be done interacting directly with the notary system 500); (6) receiving a scratch off request for the virtual instant lottery ticket (and particularly the digital object) and facilitating the scratch off request; (7) upon receiving an authorized request, removing the envelope from the virtual instant lottery ticket (and particularly from the digital object); (8) redeeming the final winning virtual instant lottery ticket (and particularly the digital object) after the virtual instant lottery ticket (and particularly the digital object) is scratched and submitted for redemption. The lottery owner system 400 is also operable with the notary system 500 to (9) for each respective transaction for the virtual instant lottery ticket (and particularly the digital object), enable the notary system 500 to track and record such transaction.

Generally, the example notary system 500 of the example system 100 is operable to, after creation of the virtual instant lottery ticket (and particularly the digital object): (1) track and record the sale of the virtual instant lottery ticket (and particularly the digital object); (2) track and record each transfer of the virtual instant lottery ticket (and particularly the digital object); (3) track and record any start of the scratching of the SOC of the virtual instant lottery ticket (and particularly the digital object); (4) track and record the redemption of the virtual instant lottery ticket (and particularly the digital object); and (5) for each tracking and recording step, apply a notary system digital signature to the virtual instant lottery ticket (and particularly the digital object). It should be appreciated that in various embodiments of the present disclosure, the notary system 500 maintains all information regarding the sale, transfer(s), scratching, and redemption of the virtual instant lottery ticket.

More specifically, the virtual instant ticket factory system 200 of the system 100 of this example embodiment employs a PA Domain that can include or be different from the P1 and P2 Domains used in the physical instant lottery ticket manufacturing system as described above. The PA Domain is used to guarantee that the ticket identifier originally used in the instant lottery game creation (referred to as the idTicketOrig prior to the Virtual Printing shown in FIG. 5) is scrambled to a new identifier (referred to as the idTicket in FIG. 3, FIG. 4, and FIG. 5) that is used in the instant lottery ticket manufacturing and distribution processes.

The system 100 further includes two domains referred to herein as the PB Domain and the PC Domain. The system 100 employs the PB Domain for the virtual instant lottery tickets to replace the physical SOC coating process with a virtual SOC coating process employing a public key encryption. More specifically, the system 100 includes the use of a physically independent virtual coating key factory system 300 and a physically independent lottery owner system 400 to further create the digital object 150 that is the virtual instant lottery ticket. In various embodiments of the present disclosure, the virtual coating key factory system 300 is and remains independently controlled from both the virtual instant ticket factory system 200 of the virtual instant lottery ticket manufacturer and the lottery owner system 400 of lottery administrator. In various embodiments of the present disclosure, the lottery owner system 400 is and remains independently controlled from both the virtual instant ticket factory system 200 of the virtual coating key factory system 300. In various embodiments of the present disclosure, the lottery owner system 400 is a system of the lottery administration entity that manages the delivery of the instant lottery game to the player devices (i.e., that sells and handles transfers of the virtual instant lottery tickets and that manages the ticket redemptions including providing awards to the players). The system 100 employs the PC Domain for virtual instant lottery tickets under the control of the lottery owner system 400 as further described below.

Figure 4:
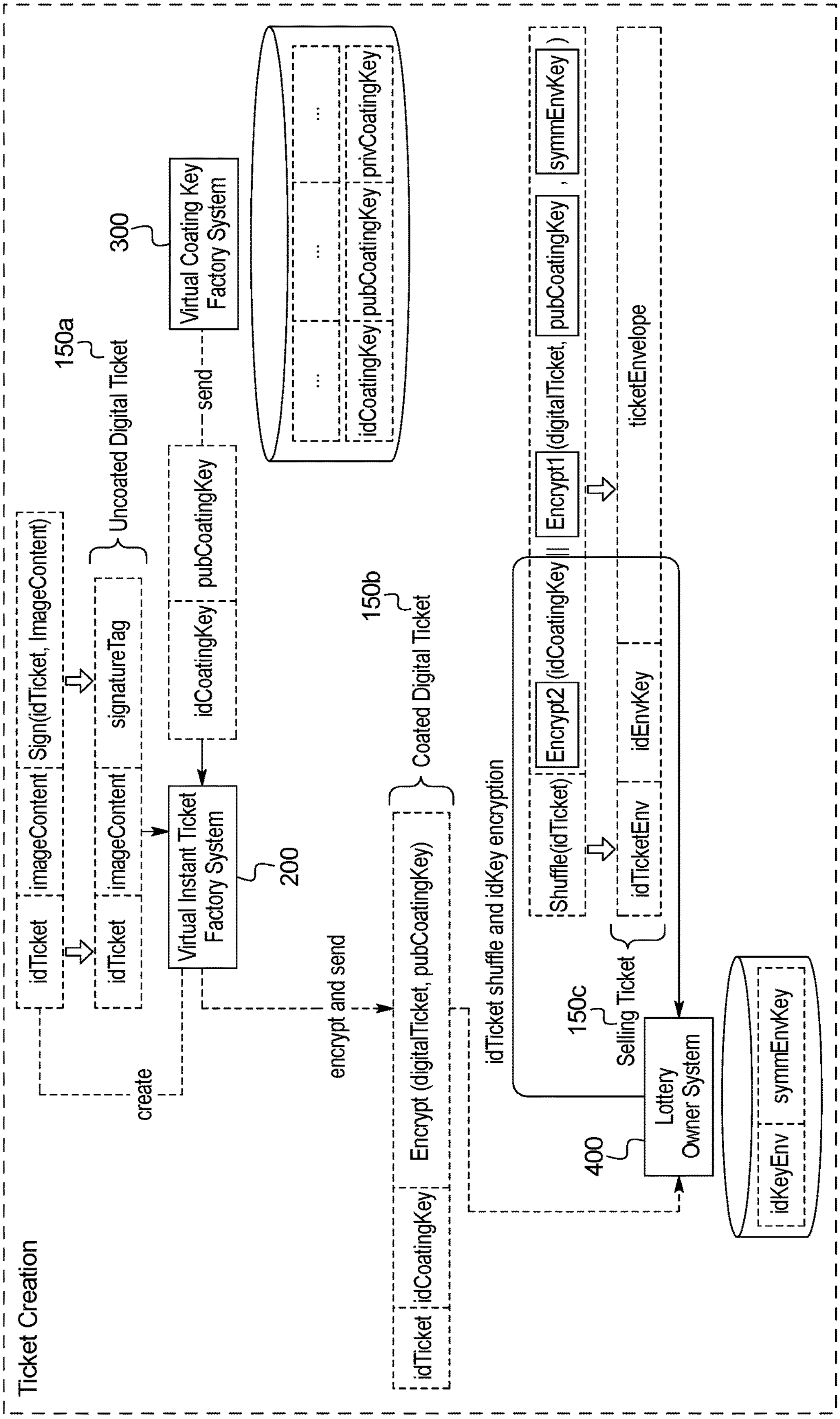
FIG. 4 is a schematic diagram showing part of the virtual instant lottery game system of FIG. 3, and which shows the virtual instant lottery ticket creation process performed by the virtual instant ticket factory system, the virtual coating key factor system, and the lottery owner system of the virtual instant lottery game system of FIG. 3.
Figure 5:
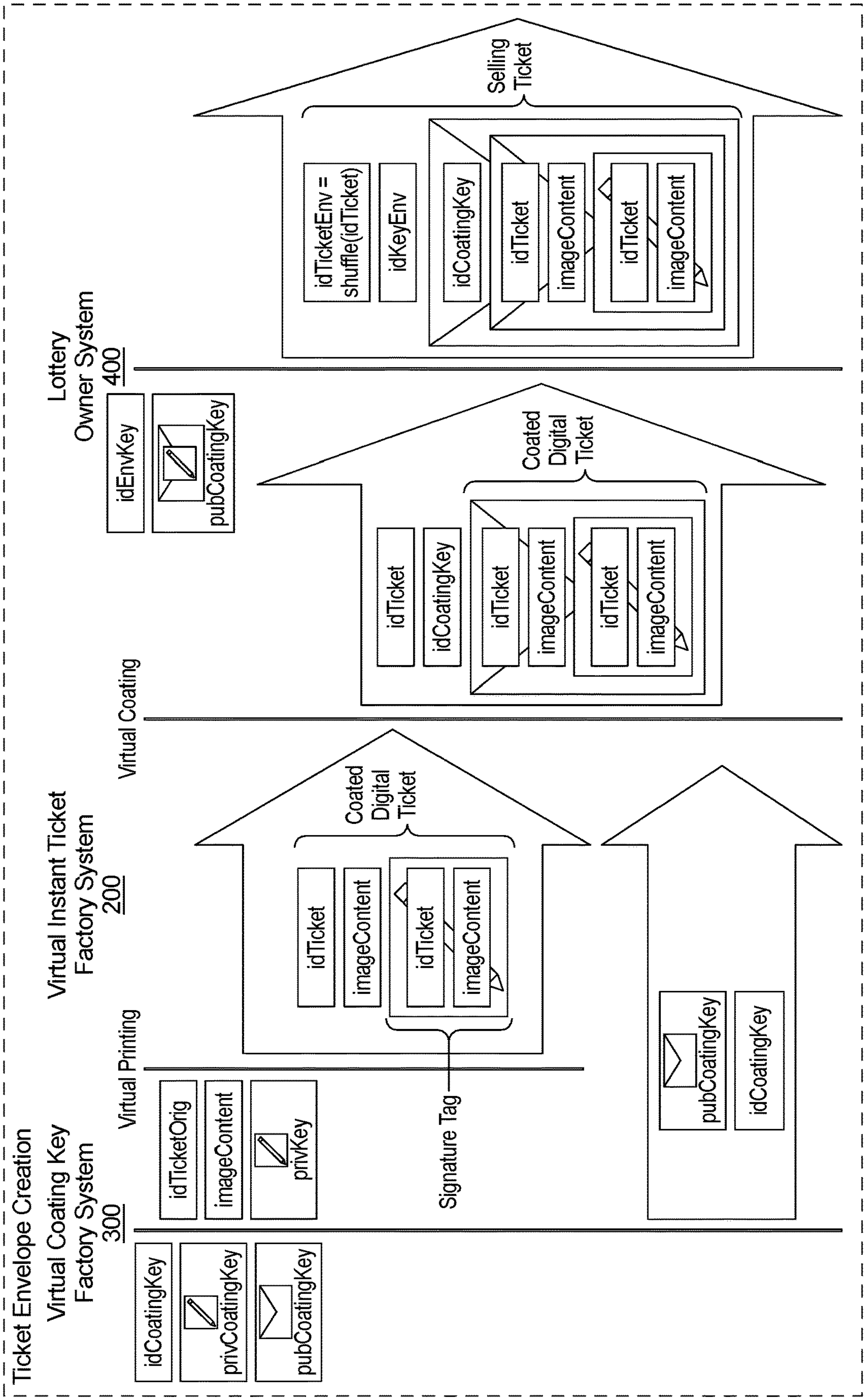
FIG. 5 is a flow chart showing part of the virtual instant lottery ticket creation process (including the envelop creation process) performed by the virtual instant ticket factory system, the virtual coating key factor system, and the lottery owner system of the virtual instant lottery game system of FIG. 3.

Referring also now to FIGS. 4 and 5, FIGS. 3, 4, and 5 further illustrate the virtual instant lottery ticket creation process of one example embodiment of the present disclosure along with the detailed transformations and modification of the digital object 150 that is the virtual instant lottery ticket (as well as message exchanges as further described below). FIGS. 3, 4, and 5 show the process from the determination of the original image for the virtual instant lottery ticket to the final envelope creation for digital object 150 that functions as the virtual instant lottery ticket. The virtual instant lottery ticket creation process generally includes: (1) the virtual ticket creation and virtual SOC coating carried out by the virtual instant ticket factory system 200 and the virtual coating factory system 300, and (2) the virtual ticket envelope creation process carried out by the lottery owner system 400. After these processes, the created virtual instant lottery ticket in the form of the digital object is ready for the selling process as further described below.

More specifically, FIG. 4 illustrates the virtual creation and virtual SOC coating carried out in the virtual instant ticket factory system 200 and the virtual coating factory system 300. As mentioned above, the PA Domain implements the printing and coating process using as inputs the image for the virtual instant lottery ticket and the shuffled ticket index. The system 100 uses the same inputs for backward compatibility as with the above described processes for physical instant lottery tickets. The difference is that for the virtual instant lottery tickets, the system 100 replaces the actual physical ticket printing and coating processes with the encryption of the image of the virtual instant lottery ticket to create the digital object 150 for that virtual instant lottery ticket using a public key encryption scheme.

Specifically, the system 100 conceals the image of the virtual instant lottery ticket and therefore also the information about any award associated with the virtual instant lottery ticket by encrypting the virtual instant lottery ticket with the public key of a trusted third party entity system that is the virtual coating key factory system 300 in this example embodiment. The secrecy of this dematerialized coating process is guaranteed by such a new trusted third party system 300 that becomes the only actor capable of decrypting (i.e., scratching the coating off of) the virtual instant lottery ticket, as discussed below.

In various embodiments of the present disclosure, to provide strict guarantees on the correct development of the instant lottery game, the system 100 deploys the virtual coating key factory system 300 via an independent third party entity. In various lottery jurisdictions, this virtual coating key factory system 300 can be provided by a controlling lottery authority that already supervises the strictly regulated gaming sector. For instance, the extraction process for lottery games is already operated and managed by hardware security modules controlled by an independent controlling lottery authority rather than the lottery owner entity, and can thus readily also provide and control this virtual coating key factory system 300.

In this example embodiment, the system 100 uses inputs for the creation of the digital object 150 of the virtual instant lottery ticket that are exactly the same as for the creation of a physical instant lottery ticket using the PA Domain of the virtual instant ticket factory system 200. As shown in FIG. 4, these inputs include: (1) the idTicket that is the identification of the ticket in the production phase, which may differ from the original index idTicket used for lottery game creation purposes; and (2) the imageContent that is part of the digital object that represents the image of the virtual instant lottery ticket in exactly the same format that would be provided for the physical printing and coating processes for a physical instant lottery ticket.

The system 100 then creates a ticket virtual printing integrity tag. Since the virtual instant lottery ticket is not printed as a physical object and thus may be subject to subsequent tampering, the system 100 adds this integrity tag to the image of the virtual instant lottery ticket. For this purpose, the virtual instant ticket factory system 200 digitally signs the image of the virtual instant lottery ticket and the idTicket as indicated in FIGS. 4 and 5, and produces a digital signature tag that is carried along with the ticket id and image content for the virtual instant lottery ticket for later verification purposes. In other words, the digital signature tag becomes part of the data of the digital object 150*a* representing the virtual instant lottery ticket. It should be appreciated that the digital signature tag is applied to the idTicket and imageContent so as to cryptographically bind the image for the virtual instant lottery ticket to its identifier, hence guaranteeing unicity of the digital object (by construction, the idTicket is unique). At this stage, the output of is therefore a virtual instant lottery ticket represented by the digital object 150*a* including the idTicket, the imageContent, and the signatureTag, as shown in FIGS. 4 and 5.

The system 100 then creates a ticket virtual SOC coating in the form of a public key encryption. More specifically, after the above virtual printing process, the system 100 protects the virtual instant lottery ticket content. As a digital equivalent of SOC coating, the system 100 uses public key encryption. For this purpose, the virtual instant ticket factory system 200 uses the public key pubCoatingKey that is provided by the virtual coating key factory system 300 for that virtual instant lottery ticket, as well as the identifier idCoatingKey of the public key specifically used, as shown in FIGS. 4 and 5. It should be appreciated that the usage of a key identifier along with the actual key is a well understood practice to permit usage of different keys in different contexts/games, as well as permit rekeying in different time periods. While any suitable public key encryption may be employed in accordance with the present disclosure, in various example embodiments of the present disclosure, the system 100 employs a asymmetric encryption scheme that can be applied to arbitrary size messages and further provides integrity guarantees. In various such embodiments of the present disclosure, the hybrid encryption scheme includes ordinary symmetric encryption and integrity algorithms for the actual protection of the data object (e.g., asymmetric cryptography is used to derive/transfer the symmetric key). In analogy with a physical process, where the SOC is not be applied to the ticket index, the system 100 causes a copy of the ticket index to remain clear along with the identifier of the public key used. At this stage, the output of is therefore a virtual instant lottery ticket represented by the digital object 150*b* including: the idTicket, the Encrypt (digitalticket, pubCoatingKey), and the identification of pubCoatingKey, as show in FIGS. 4 and 5.

In certain example embodiments, the system 100 may employ a further architectural-level solution to address potential ticket frauds threats such as a PA Domain employee being able to parse an image of the virtual instant lottery ticket and hence spoil a winning virtual instant lottery ticket. This threat is the possibility of an attacker capable of breaking a single entity component to retrieve the association between a ticket index used in the logistic/distribution process, and the underlying award associated with the given virtual instant lottery ticket. In certain example embodiments, the system 100 addresses this by employing the PC Domain and as early as the virtually coated (e.g., public key encrypted) digital object 150 representing the instant lottery ticket is first delivered to the lottery owner system 400, causing a further shuffling process related to the digital object 150 representing the virtual instant lottery ticket. In certain other example embodiments, the system 100 may employ an additional envelope but does not cause a further shuffling process related to the digital object 150 representing the virtual instant lottery ticket.

In certain example embodiments of the present disclosure where the additional shuffling is employed, this further shuffling of the virtual instant lottery ticket is not just of the ticket index because if such shuffling is limited to the ticket index, an insider attacker in the PA Domain could take note of the actual ciphertext pattern and subsequently backtrack it when the virtual instant lottery ticket is processed for sale, or even after the virtual instant lottery ticket is sold. In other words, an attack can occur where a wholesaler colluding with a PA Domain insider may acquire and download a large amount of virtual instant lottery tickets, check their encryption patterns, and based on this information, keep for itself the large award winning virtual instant lottery tickets and resell the remaining virtual instant lottery tickets. The system 100 produces the virtual coating stratum by encryption, and hence each two encrypted virtual instant lottery tickets will be different because they necessarily expose two different ciphertext patterns. In other words, in certain embodiments, prior to delivery of the virtual instant lottery tickets for the sale process, the system 100 applies a further level of ticket index permutation and content protection, so as to produce the digital object 150*c* including a ticket envelope that is unlinked from the digital object of the virtual instant lottery ticket managed by the PA and PB Domains.

More specifically, in certain embodiments, the system 100 may use what is referred to herein as a secret envelope that addresses such attack scenarios. In these embodiments, the system 100 provides this additional envelope protection function that includes a twofold processing task on the virtually coated (public key encrypted) virtual instant lottery ticket. This twofold processing task includes: (1) a further secure pseudo-random permutation (shuffling) of the ticket index, and (2) the re-encryption of the already encrypted virtual instant lottery ticket, so as to randomize the ciphertext pattern, as generally shown in FIGS. 4 and 5. In these embodiments, this combination of a further secure permutation of the ticket index and the ticket re-encryption, which is possible because the virtual instant lottery ticket is digitalized rather than being physically printed, avoids a single central point of trust.

In certain of these embodiments, to retrieve the original ticket index, an external attacker would need to invert both independent shuffles performed by the two different independent decentralized systems. Furthermore, in these embodiments, the further permutation of the ticket index produced by PA Domain guarantees that the virtual instant lottery ticket numbers used for sale will be different from those used for ticket image content concealment (i.e., the virtual printing and coating operation performed by the public key encryption). It should be appreciated that this approach does not appear to be technically possible in the physical domain because after a physical instant lottery ticket is manufactured, it cannot be modified anymore. Thus, the level of security for the dematerialized instant lottery ticket for these embodiments of the present disclosure is not just equivalent to the level of security for the physical instant lottery ticket; but rather due to this supplementary envelope protection, in certain embodiments, the system 100 guarantees a significantly improved security above that provided by the physical instant lottery ticket manufacturing process.

In various example embodiments of the present disclosure, and as shown in FIGS. 4 and 5, this process is performed locally by the lottery owner system 400 (e.g., the PC Domain). That example system 400 in certain embodiments uses symmetric encryption without the assistance of an external translator or key factory. The reason for using this encryption method is that an insider attacker in the PC Domain, even if capable of reverting the envelope protection, has no way to track a virtual instant lottery ticket, unless the attacker additionally colludes with a different insider attacker in the PA Domain. The system 100 of these embodiments should thus eliminate attack scenarios that involve single attackers. It should also be appreciated that for exactly the same reason, and if the system 100 only produces virtual instant lottery tickets, this can permit a less restrictive implementation requirement in the virtual instant ticket factory system 200.

The system 100 implements the last ticket creation processing step in the PC Domain as follows. The system 100 uses the input the digital object 150*b* that represents a coated digital ticket produced by the virtual instant ticket factory system 200 (as explained above and including: the idTicket, the idCoatingKey, and the ENCpubCoatingKey(digitalTicket).

In certain embodiments, the system 100 outputs a digital object 150*c* that represents a sellingTicket including the following three fields: (1) a idTicketEnv that is the identification of the virtual instant lottery ticket to be used in the selling phase, that may be computed as a format-preserving pseudo-random-permutation (shuffling) of the idTicket used for virtual instant lottery ticket manufacturing (in turns different from the idTicketOrig used for instant lottery game creation) or may be the same idTicket (depending on implementation); (2) a ticketEnvelope that is the ciphertext corresponding to the symmetric encryption of the entire coatedTicket object; and (3) an idEnvKey that is the index of the symmetric key (used to produce both the ticket index permutation as well as the ticket re-encryption). This refers to a same master key, using a HKDF to derive the two specific keys used for the two different tasks. It should be appreciated that in certain embodiments, the secret envelope is not employed such as where ticket shuffling is not possible for different reasons such as administrative rules or process rules already in place.

It should be appreciated that for this dematerialized instant lottery ticket, the lottery owner system 400 functions in certain embodiments to partially secure the virtual instant lottery ticket itself via the secure envelope provided to the digital object 150 as described above. This differs from the physical instant lottery tickets where the lottery owner is focused on the management of the ticket distribution and selling processes, and the verification of the wins and relevant award reimbursement.

The system 100, in addition to the legacy system components used for managing the physical ticket and also used for activation, validation and verification, can then employ: (1) the lottery owner system 400; (2) the notary system 500; and (3) one or more of the lottery player devices 600, 600*a*, 600*b*, . . . 600*n*, to collectively facilitate and control: (1) virtual instant lottery ticket selling; (2) virtual instant lottery ticket transferring; (3) virtual instant lottery ticket scratching; and (4) virtual instant lottery ticket redemption, as shown in FIGS. 6, 7A, 7B, and 8, and as further described below.

It should be appreciated that in this example embodiment, each lottery player device 600 includes an application loaded on that lottery player device 600 in any suitable manner. In various embodiments of the present application, the lottery player device 600 including this application is uniquely identified by the system 100 using a self-certifying pseudonym cryptographic technique (such as one widely used in current blockchain deployments) that facilitates the management of identities without any identity provider, thus guaranteeing player anonymity (as required by the instant lottery game). More specifically, each lottery player device 600 including this application will be configured to: (1) autonomously generate a public/private key pair; (2) use the public key (such as a hash of the public key) as the player or player device identifier; and (3) authorize transaction requests by digitally signing them using the private key associated to the employed public key. This provides a robust approach widely employed in worldwide blockchains. Specifically, as long as the private key associated to a public key identity is never disclosed, this approach prevents any other player from impersonating a target player while preserving the anonymity of the target player.

In this example embodiment, the notary system 500 includes an append-only database in charge of tracking the "property" of each virtual instant lottery ticket (such as recording and updating the mapping between the virtual instant lottery ticket and its "owner", which is namely a player or player device identifier and specifically that is the above self-certifying pseudonym, throughout the lifetime of digital object 150 representing the virtual instant lottery ticket). The notary system 500 further certifies all transactions involving the digital object 150 representing the virtual instant lottery ticket by explicitly signing the digital object 150 for each of the transactions. For this purpose, the notary system 500 is provided with a pair of public/private keys. In certain embodiments of the present disclosure, a Transaction Certification Authority (TCA) (such as described in U.S. Patent Application Publication No. 2019/0280875) is used as part of the notary system 500.

The lottery owner system 400 orchestrates all of the involved transactions with the digital object 150 for the virtual instant lottery ticket. The lottery owner system 400 directly interfaces with the lottery player device 600 for any operation, and acts as a proxy for all transactions involving the notary system 500. The lottery owner system 400 initially issues the digital object 150 for the virtual instant lottery ticket in the register of the notary system 500, and redeems the final winning virtual instant lottery ticket once the virtual instant lottery ticket is scratched. For these purposes, the lottery owner system 400 is also provided with a public/private key pair so as to permit lottery ticket transfers via the lottery owner system 400 similar to how physical lottery tickets are transferred to and from players. Furthermore, the lottery owner system 400 also guarantees process integrity by signing message bundles including the digital objects, as further discussed below.

Figure 6:
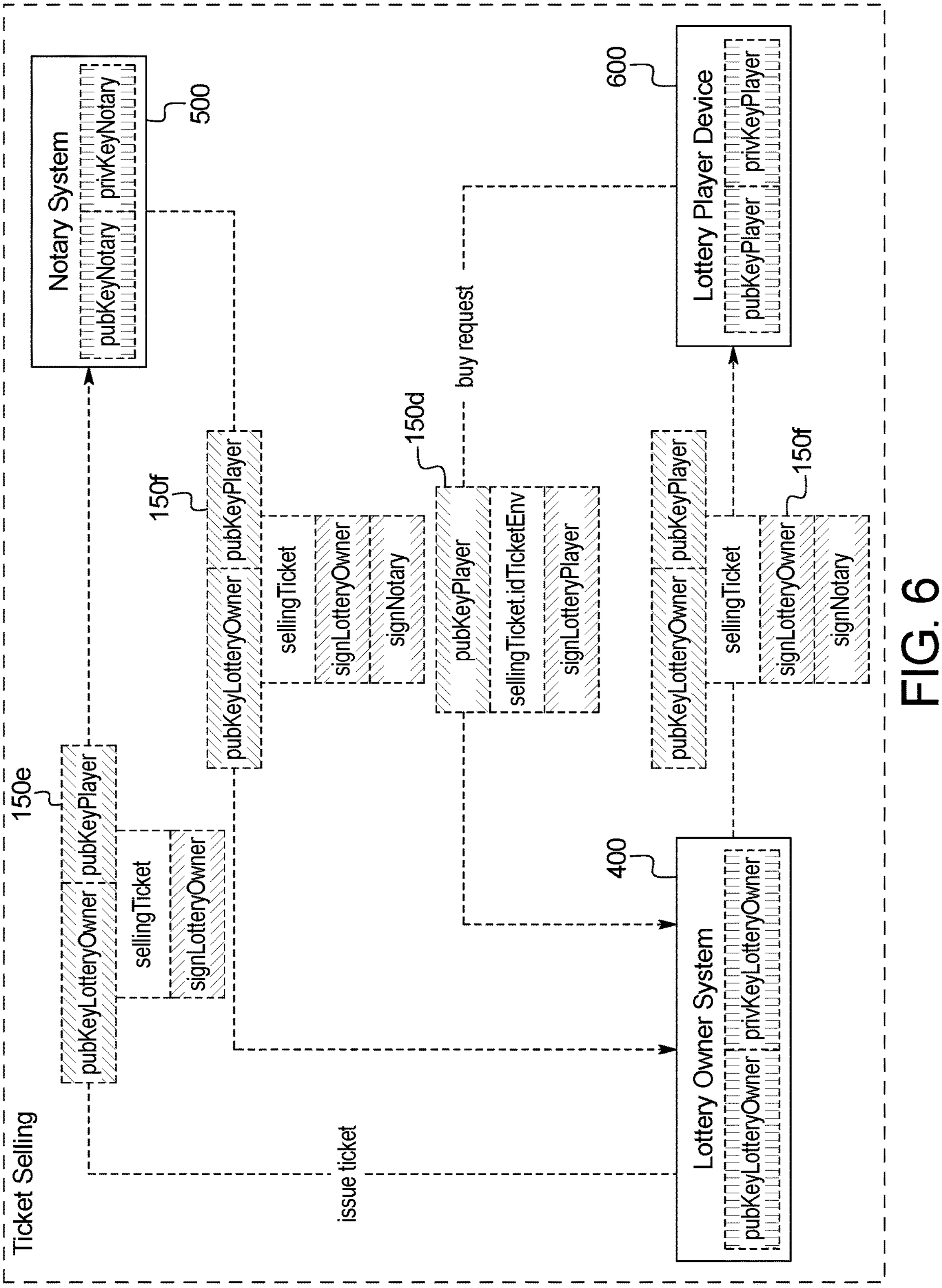
FIG. 6 is a schematic diagram showing part of the virtual instant lottery game system of FIG. 3, and which shows the virtual instant lottery ticket selling process performed by the lottery owner system, the notary system, and a lottery player device of the virtual instant lottery game system of FIG. 3.

FIG. 6 generally illustrates the selling process for the virtual instant lottery ticket. The selling process includes two main steps including: (1) receiving a buy request from a lottery player device 600; and (2) issuing the requested virtual instant lottery ticket to the lottery player device 600.

More specifically, responsive to receipt of a buy request, the lottery player system 400 chooses a desired virtual instant lottery ticket (that in various example embodiments includes a sellingTicket digital object comprising both the ticket envelope index as well as payload) via a suitable ticket sale interface, and issues a buy request command using the ticket index (i.e., the idTicketEnv of the chosen virtual instant lottery ticket). The nature of the self-certifying user identities here significantly simplifies and secures this step, as this transaction may be authenticated using a digital signature, which, other than starting the ticket acquisition process, also guarantees non repudiation of the committed transaction. It should be appreciated that the lottery player device signature is performed with the private key uniquely associated to the used player's identity or player device identity (i.e., the public key), and thus does not need to involve user registration procedures that might hinder the player rights to avoid disclosing the player's real identity while buying a virtual instant lottery ticket using the system 100. In other words, by using this approach, the system 100 mimics the same physical process where players remain unknown.

The ticket issuing includes the lottery owner system 400 taking the digital object 150*d* of the virtual instant lottery ticket selected by the player device 600 (using the ticket sale interface) and the player's identifier (e.g., the public key), and sending both to the notary system 500 for transaction registration, as indicated in FIG. 6. It should be appreciated that, in certain embodiments, the registration is performed inside an append-only ledger (further certified by the trusted third party notary system 500), where the only entity having the permission to issue a virtual instant lottery ticket is the lottery owner system 400. It should also be appreciated that, in certain embodiments, the issuing can only be done by the lottery owner 400 while the transferring can be done by the player device 600. For this reason, the pair (sellingTicket, pubKeyPlayer) is digitally signed by the lottery owner system 400, which is registered inside the ledger of the notary system 500 as a "ticket issuing" transaction from the lottery owner system 400 to the lottery player device 600. Once this transaction is registered, the notary system 500 further certifies the digital object 150 by returning to the lottery owner system 400 the sellingTicket digital object 150*f* bound to the pseudonym of the lottery player device 600 with a digital signature covering both fields. The lottery owner system 400 then transfers the digital object 150*f* to the lottery player device 600. The lottery player device 600 then has an "ownership" proof, certified by the notary system 500, that the selected digital object 150*f* representing the virtual instant lottery ticket has been registered under the player's pseudonym.

It should be appreciated that the above process is configured to enable the digital object 150 representing the virtual instant lottery ticket to be transferred among players (such as a gift of a virtual instant lottery ticket to a friend or a family member). This functionality enables the same operations that are possible with physical instant lottery tickets (such as the possibility to buy a physical instant lottery ticket and give it to someone else).

The transfer procedure may be any suitable transfer procedure between lottery player devices 600 of the two players. For instance, the lottery player device 600*a* can send a signed message to the notary system 500 wherein the message includes the digital object 150 representing the virtual instant lottery ticket and the identity of the target lottery player device 600*b* to whom the virtual instant lottery ticket will be transferred. Responsive to such message, the notary system 500 verifies and registers the relevant transaction, and responds with causing the sellingTicket digital object 150 to be bound to the new lottery player device 600*b*. The lottery owner system 400 also transfers the digital object 150*f* to the lottery player device 600*b*.

It should be appreciated that in the both the selling and transferring processes for digital object representing a virtual instant lottery ticket, the ticket envelope for that digital object 150 representing the virtual instant lottery ticket is never opened, for security reasons as discussed below.

Figure 7A:
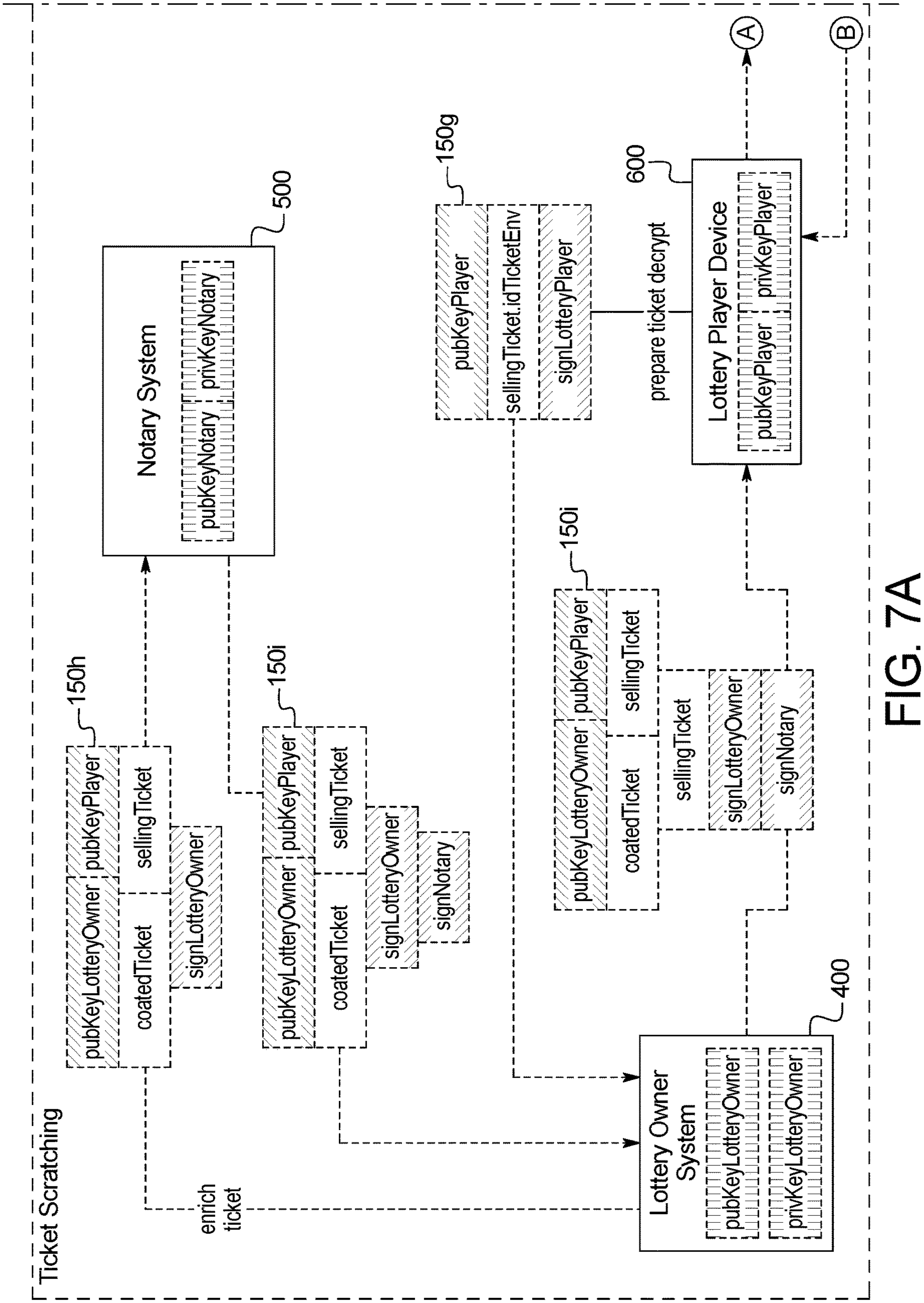
FIGS. 7A and 7B are a schematic diagram showing part of the virtual instant lottery game system of FIG. 3, and which shows the virtual instant lottery ticket scratching process performed by the virtual coating key factory system, the lottery owner system, and the notary system (in conjunction with a lottery player device) of the virtual instant lottery game system of FIG. 3.
Figure 7B:
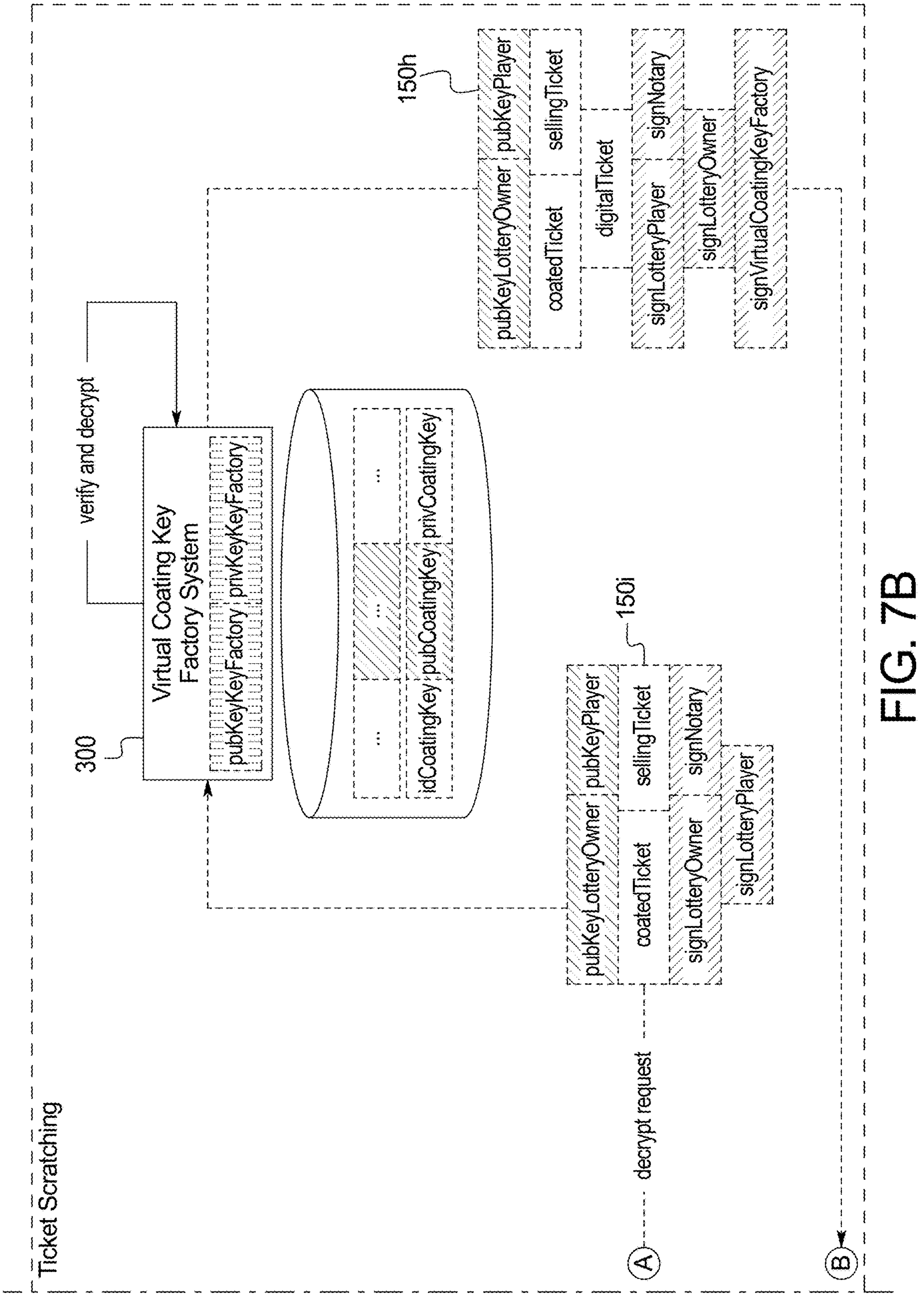

FIGS. 7A and 7B generally illustrate the virtual instant lottery ticket scratching process of this example embodiment of the present disclosure. This example virtual instant lottery ticket scratching process includes revealing any indicia that indicates any award associated with the virtual instant lottery ticket. This scratching process generally includes reverting the two encryption layers introduced during the virtual instant lottery ticket creation process described above. It should be appreciated that this scratching process is not simple because once the outer envelope is removed, and even if the virtual instant lottery ticket is not yet "scratched," the virtual instant lottery ticket ownership (i.e., the identification of the ticket holding player device) must be in any case "frozen" and transferability is not subsequently possible in various embodiments of the present disclosure. This requirement is necessary to cope with a possible wholesale insider attacks, where a PA Domain insider is able to spot winning virtual instant lottery tickets while processing virtual instant lottery tickets in the PA Domain and buys a large quantity of virtual instant lottery tickets, removes the envelope(s) thus recognizing the winning virtual instant lottery tickets, and then transfers (such as by re-selling) only the losing virtual instant lottery tickets. Thus, the system 100: (i) explicitly records via the notary system 500 the changed state of the virtual instant lottery ticket while it is being scratched; and (ii) guarantees that, once started, the scratching process cannot be reverted (e.g., forward atomicity of the transaction: once started it must get to completion). This second process can be done in any suitable manner. It should be appreciated that once the scratching process begins, the ticket cannot be transferred to another player device. It should also be appreciated that the present disclosure contemplates that the notary system 500 may limit or not limit access to its tracking records for the digital objects and thus virtual instant lottery tickets.

It should be appreciated that the process is not simple in part because for auditing requirements, the system 100 needs to provide the information necessary for all the involved parties (including the player device 600) to verify if/when necessary that the scratching process has been correctly executed. In other words, the player via their lottery player device should be given a way to check later on that the virtual instant lottery ticket originally bought is the one that the player has scratched. The mere removal of the outer envelope from the digital object 150 is therefore not sufficient.

The system 100 addresses these two requirements using two complementary approaches including: (1) registration of a scratching transaction in the register of the notary system 500 that blocks subsequent transferability of that virtual instant lottery ticket; and (2) creation of a secure ticket bundle including the digital object, via subsequent digital signatures incrementally binding the various layers comprising the digital object 150 representing the virtual instant lottery ticket.

More specifically, as shown in FIGS. 7A and 7B, the scratching process is initiated by the player via a graphical user interface (GUI) displayed by the lottery player device 600. The lottery player device 600 creates and sends a scratching request with the digital object 150*g* to the lottery owner system 400. This request is digitally signed by the lottery player device 600, so as to: (i) certify that only the specific lottery player device 600 that owns the private key associated to that id may scratch the virtual instant lottery ticket owned or held by that lottery player device 600; and (ii) guarantee non repudiation of the start of such scratching process, in the case of further questioning.

Responsive to receiving the scratching request, the lottery owner system 400 facilitates the player's scratching request. Since scratching requires that the ticket envelope is first removed, the lottery owner system 400 performs the relevant symmetric decryption and the associated ticket index inverse shuffling so as to restore the "coated" ticket as well as its index used by the legacy systems for validation (e.g., the index analogous to a physical lottery ticket). However, the lottery owner system 400 does not discard the envelope; rather, the lottery owner system 400 creates a first ticket bundle including the digital object 150*h*, that is referred to as the ticket scratching bundle. This is a message digitally signed by the lottery owner system 400. The digital signature: (i) permits registration of the scratching transaction in the ledger of the notary system 500 (see below); and (ii) cryptographically binds all the fields included in the message, specifically including: (a) the selling virtual instant lottery ticket; (b) the coated virtual instant lottery ticket; (c) the public key of the lottery player device 600 that is scratching the virtual instant lottery ticket; and (d) the public key of the lottery owner system 400.

The ticket scratching bundle is then sent to the notary system 500. Response to receiving the ticket scratching bundle, the notary system 500 issues a scratching transaction and records it in the append-only register of the notary system 500. This transaction containing both selling ticket identifier as well as player identifier is used to "freeze" the virtual instant lottery ticket forever. Specifically, its presence in the register of the notary system 500 can be checked by the lottery owner system 400 for each ticket transfer attempt, and when present, based on such information provided by the notary system 500, the lottery owner system 400 can stop further transfer of ownership of that virtual instant lottery ticket to any other player (with the only exception being the transferability of ownership to the lottery owner system 400 for ticket redemption as described below). In various embodiments of the present disclosure, the notary system 500 is passive and only checks if issuing, transferring, and/or scratching of the digital object and thus the virtual instant lottery ticket is possible at the requested point in time.

The notary system 500 also sends back a notarized ticket scratching bundle including the digital object 150*i* (which includes the ticket scratching bundle further signed by the notary system 400). Note that one goal of such bundle is to have a single point (the bundle itself), distributable throughout the system 100 and the lottery player device 600 in which all the executed steps are cryptographically registered. Not only does this have immediate utility in guaranteeing the difficulty in breaking the binding between different versions of the virtual instant lottery ticket (such as the selling version versus the coated version), but this organization of the data as a secure bundle travelling along with the process may significantly simplify the auditing and dispute processes.

The notarized ticket scratching bundle including the digital object 150*i* is then forwarded to the lottery player device 600. The lottery player device 600 adds its further signature to the bundle including the digital object 150*i*, and sends to the bundle including the digital object 150*j* to the virtual coating key factory system 300 for the actual scratching of the virtual instant ticket lottery ticket. This actual scratching includes the verification of the integrity of the whole bundle (and hence also verification of the notary system's 500 signature and the authentication of the lottery player device 600). It should be noted that the public key of the lottery player device 600 is implicitly certified by the notary system 500, so no PKI is required), followed by the decryption of the coated virtual instant lottery ticket using the private key of the virtual coating key factory 300. A suitable graphical user interface may be associated with this process.

The virtual coating key factory system 300 sends back to the lottery player device 600 a redeemable ticket bundle including the digital object 150*k* (e.g., the current ticket bundle further extended with the decrypted digital object sealed with the virtual coating key factory system signature). Note that such final bundle tracks all the process steps, and cryptographically binds all the different versions of a same virtual instant lottery ticket, so as to limit vulnerabilities or attacks revolving around the possibility to fraudulently associate different representations of different virtual instant lottery tickets (e.g., to fraudulently combine a winning digital object with a different envelope representation).

Figure 8:
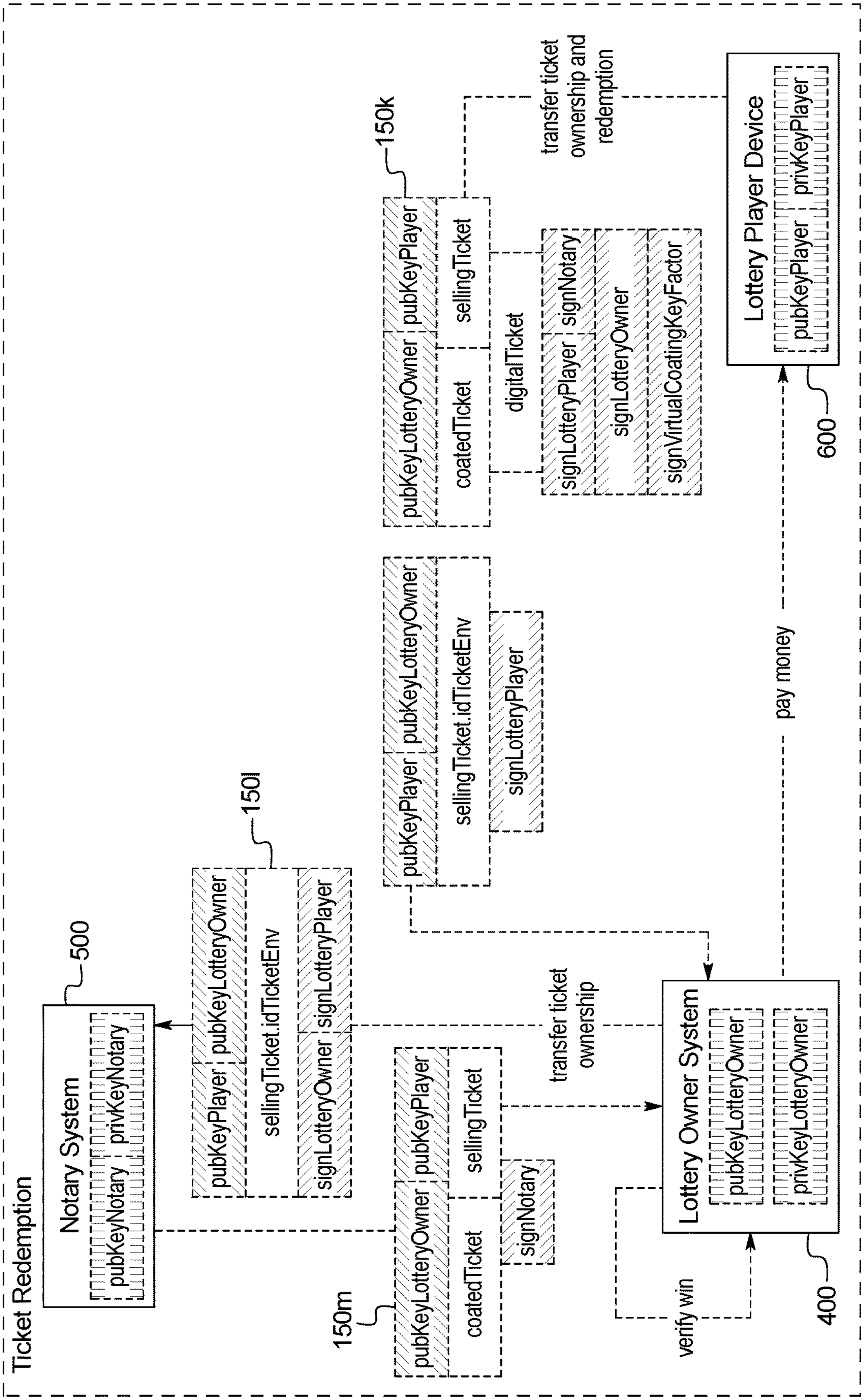
FIG. 8 is a schematic diagram showing part of the virtual instant lottery game system of FIG. 3, and which shows part of the virtual instant lottery ticket redemption process performed by the lottery owner system, and the notary system (in conjunction with a lottery player device) of the virtual instant lottery game system of FIG. 3.

FIG. 8 generally illustrates the ticket redemption process of the example system 100. The ticket redemption process includes, in the case of a winning virtual instant lottery ticket, the player device 600 transferring the digital object 150*k* representing the virtual instant lottery ticket to the lottery owner system 400 for redemption in a similar manner to the redemption process for winning physical instant lottery tickets.

More specifically, the lottery player device 600 sends the redeemable ticket bundle including the digital object 150*k*, including all the notary system and other signature proofs including the scratching process, to the lottery owner system 400. The lottery owner system 400 sends the digital object 150*l* to the notary system 500 for tracking and recording of the redemption request. The notary system 500 records and signs the digital ticket 150*l* and sends the signed digital ticket 150*m* back to the lottery owner system 400. The lottery owner system 600 verify that the digital ticket 150*l* has all of the required signatures and that instant lottery ticket represented by the digital ticket 150*l* is a winning virtual instant lottery object. The lottery owner system 600 also determines any awards associated with the digital ticket 150*l*. This verification process may include the lottery owner system 600 interfacing with one or more legacy system(s) (not shown) and processes for physical ticket redemption. The lottery owner system 600 causes any award to be paid to the player via the player device, as shown in FIG. 8. This award may be paid to the player in any one of a plurality of different suitable manners.

It should be appreciated from the above, that in various embodiments, parts of the lottery gaming system and method of various embodiments of the present disclosure are configured to be operated by a lottery agency (such as a state lottery agency).

It should be appreciated from the above, that in various embodiments, parts of the lottery gaming system and method of various embodiments of the present disclosure are configured to be operated by a third party that runs the lottery for a lottery agency (such as a state lottery agency).

It should be appreciated from the above that the player device may be any suitable player device such as a cell phone, mobile device, or other suitable device such as described below.

It should be appreciated from the above that devices in communication with each other need not be continually transmitting to each other. On the contrary, such devices need only transmit to each other as necessary, and may actually refrain from exchanging data most of the time. For example, a device in communication with another device via a data network may not transmit data to the other device for hours at a time.

The above-described embodiments of the present disclosure may be implemented in accordance with or in conjunction with one or more of a variety of different types of systems, such as, but not limited to, those described below.

The present disclosure contemplates a variety of different systems each having one or more of a plurality of different features, attributes, or characteristics. A system as used herein refers to various configurations of one or more servers, controllers, or other computer systems.

A player device as used herein refers to one or more personal devices, such as desktop computers, laptop computers, tablet computers or computing devices, personal digital assistants, cell phones, mobile phones, and other mobile computing devices. In various embodiments, the system includes one or more servers configured to communicate with the player device to enable instant lottery game play using the player device. In various embodiments, the player must first access a gaming website via an Internet browser of the player device or execute an application (commonly called an "app") installed on the player device before the player can use the player device to participate in instant lottery game play. It should also be appreciated that in various embodiments of the present disclosure, a player may access the game in a retailer location where the retailer buys and sells the virtual instant lottery tickets using a terminal device (that in certain embodiments thus functions as or in place of the player device). In certain such embodiments the player can use the player's mobile phone to take a picture of the virtual instant lottery ticket that retailer exposes using the monitor of the terminal device.

In various embodiment of the present disclosure, the player device can be configured to maintain, for each ticket issued or transferred to that player device, a ticket reference enabling retrieval of the complete ticket belonging to that player device. If the player device is lost or stolen, using the private key, the system 100 can be configured to retrieve the complete ticket.

In various embodiments of the present disclosure, the systems and the player devices are configured to communicate through a suitable data network. In certain embodiments, the data network is a local area network (LAN). In certain embodiments, the data network is a wide area network (WAN). In certain embodiments, the data network is an internet (such as the Internet) or an intranet. In certain embodiments, the data network is a private secured network.

In various embodiments of the present disclosure, the systems are configured to connect to the data network in a suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium.

In various embodiments of the present disclosure, each system has one or more processors. Each processor is a suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information) via a communication interface; (2) converting signals read by an interface to a format corresponding to that used by software or memory; (3) accessing memory to configure or reconfigure parameters in the memory; (4) communicating with interfaces and the peripheral devices (such as input/output devices); and/or (5) controlling the peripheral devices.

In various embodiments of the present disclosure, each system includes one or more memory devices that may include: (1) volatile memory (such as non-volatile RAM, magnetic RAM, ferroelectric RAM, and any other suitable forms); (2) non-volatile memory (such as disk memory, FLASH memory, EPROMs, EEPROMs, memristor-based non-volatile solid-state memory, etc.); (3) unalterable memory (such as EPROMs); (4) read-only memory; and/or (5) one or more secondary memory storage devices. Any other suitable magnetic, optical, and/or semiconductor memory may operate in conjunction with or as part of the systems of the present disclosure.

It will be appreciated that aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages.

Aspects of the present disclosure are described herein with reference to flowchart illustrations and/or block diagrams of methods, apparatuses (systems and devices) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In various embodiments of the present disclosure, the respective memory device is configured to store program code and instructions executable by the respective processor. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium.

In various embodiments of the present disclosure, the respective memory device stores authentication and/or validation components configured for authentication/validation of specified components and/or information, such as hardware components, software components, firmware components, peripheral device components, user input device components, information received from one or more player devices, information stored in the respective memory device.

While any wagers and any awards are described herein as amounts of monetary currency, such wagers and such awards may be non-monetary in accordance with the present disclosure.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The claims are as follows:

1. A lottery ticket system comprising:

a virtual instant ticket factory system comprising a first processor and a first memory device that stores a first plurality of instructions that, when executed by the first processor, cause the first processor to create a digital object representing a virtual instant lottery ticket for an instant lottery game based on a set of inputs, the virtual instant ticket factory system controlled by a ticket provider, the digital object comprising data representing an identification of the virtual instant lottery ticket and an image of the virtual instant lottery ticket in a format suitable for physical printing, wherein the image comprises a ticket virtual printing integrity tag that cryptographically binds the image of the virtual instant lottery ticket to the identification;

a virtual coating key factory system separate and independent from the virtual instant ticket factory system, the virtual coating key factory system controlled by a lottery authority that is separate from the ticket provider, the virtual coating key factory system comprising a second processor and a second memory device that stores a second plurality of instructions that, when executed by the second processor, causes the second processor to: (a) provide an encryption key that is employed to encrypt the digital object to apply a virtual scratch-off-coating to the virtual instant lottery ticket and conceal variable indicia of the image of the virtual instant lottery ticket, and (b) responsive to an authorized request to remove the virtual scratch-off-coating, the authorized request comprising the encrypted digital object, decrypt the encrypted digital object to remove the virtual scratch-off-coating from the virtual instant lottery ticket only one time to duplicate an effect of a removal of a scratch-off-coating of a physical instant lottery ticket;

a lottery owner system separate and independent from the virtual instant ticket factory system and the virtual coating key factory system, the lottery owner system controlled by a lottery administrator separate from the virtual instant ticket factory system and separate from the virtual coating key factory system, the lottery owner system comprising a third processor and a third memory device that stores a third plurality of instructions that, when executed by the third processor, causes the third processor to: (a) issue the virtual instant lottery ticket, (b) apply a secret envelope to the encrypted digital object before issuing the virtual instant lottery ticket represented by the encrypted digital object to a requesting lottery player device, (c) receive scratch off request for the encrypted digital object from the requesting lottery player device, (d) responsive to such scratch off request, remove the secret envelope from the encrypted digital object representing the virtual instant lottery ticket, and (e) operate with the virtual coating key factory system to remove the virtual scratch-off-coating from the virtual instant lottery ticket by providing the encrypted digital object to the requesting lottery player device for generation of the authorized request, wherein the removal enables a display device of the requesting lottery player device to display the variable indica of the virtual instant lottery ticket; and a notary system separate and independent from the virtual instant ticket factory system, the virtual coating key factory system, and the lottery owner system, the notary system controlled by an entity separate from the ticket provider, separate from the lottery authority, and separate from the lottery administrator, the notary system comprising a fourth processor and a fourth memory device that stores a fourth plurality of instructions that, when executed by the fourth processor, causes the fourth processor to track and apply digital signatures to the digital object, the fourth memory device comprising an append-only database configured to track and certify all transactions involving the digital object by signing the digital object for each of the transactions, wherein the virtual instant ticket factory system and the virtual coating key factory system are in communication with each other, the virtual instant ticket factory system and the lottery owner system are in communication with each other, and the lottery owner system and the notary system are in communication with each other, wherein the requesting lottery player device is remote from each of the virtual instant ticket factory system, the virtual coating key factory system, the lottery owner system, and the notary system.

2. The lottery ticket system of claim 1, wherein the third memory device of the lottery owner system stores a fifth plurality of instructions that, when executed by the third processor, causes the third processor to interface with the requesting lottery player device for each of a plurality of different requests relating to the virtual instant lottery ticket.

3. The lottery ticket system of claim 2, wherein the third memory device of the lottery owner system stores a sixth plurality of instructions that, when executed by the third processor, causes the third processor to operate with the requesting lottery player device to enable the requesting lottery player device to purchase the virtual instant lottery ticket represented by the digital object.

4. The lottery ticket system of claim 2, wherein the third memory device of the lottery owner system stores a sixth plurality of instructions that, when executed by the third processor, causes the third processor to operate with the notary system, for each request relating to the virtual instant lottery ticket, to send the digital object to the notary system to enable the notary system to track the request and to apply one of the digital signatures to the digital object.

5. The lottery ticket system of claim 4, wherein the fourth memory device of the notary system stores a seventh plurality of instructions that, when executed by the fourth processor, causes the fourth processor to track and record the sale of the virtual instant lottery ticket.

6. The lottery ticket system of claim 4, wherein the fourth memory device of the notary system stores a seventh plurality of instructions that, when executed by the fourth processor, causes the fourth processor to track and record a transfer of the virtual instant lottery ticket.

7. The lottery ticket system of claim 4, wherein the fourth memory device of the notary system stores a seventh plurality of instructions that, when executed by the fourth processor, causes the fourth processor to track and record any start of a scratching off of the virtual scratch-off-coating of the virtual instant lottery ticket.

8. The lottery ticket system of claim 4, wherein the fourth memory device of the notary system stores a seventh plurality of instructions that, when executed by the fourth processor, causes the fourth processor to track and record a redemption of the virtual instant lottery ticket.

9. The lottery ticket system of claim 1, wherein the third memory device of the lottery owner system stores a fifth plurality of instructions that, when executed by the third processor, causes the third processor to receive a transfer request for the virtual instant lottery ticket and facilitate a transfer of the virtual instant lottery ticket represented by the digital object to another lottery player device.

10. The lottery ticket system of claim 1, wherein the third memory device of the lottery owner system stores a fifth plurality of instructions that, when executed by the third processor, causes the third processor to send the encrypted digital object to the virtual coating key factory to enable the virtual coating key factory to remove the virtual scratch-off-coating from the virtual instant lottery ticket.

11. The lottery ticket system of claim 10, wherein the third memory device of the lottery owner system stores a sixth plurality of instructions that, when executed by the third processor, causes the third processor to facilitate a redemption of the virtual instant lottery ticket for an award associated with the virtual instant lottery ticket.

12. The lottery ticket system of claim 1, wherein the second memory device of the virtual coating key factory stores a fifth plurality of instructions that, when executed by the second processor, causes the second processor to, after removal of the virtual scratch-off-coating from the virtual instant lottery ticket begins, cause completion of the removal of the virtual scratch-off-coating from the virtual instant lottery ticket.

13. A lottery ticket system comprising:

a virtual instant ticket factory system comprising a first processor and a first memory device that stores a first plurality of instructions that, when executed by the first processor, causes the first processor to create a digital object representing a virtual instant lottery ticket for an instant lottery game based on a set of inputs, the virtual instant ticket factory system controlled by a ticket provider, the digital object comprising data representing an identification of the virtual instant lottery ticket and an image of the virtual instant lottery ticket in a format suitable for physical printing, wherein the image comprises a ticket virtual printing integrity tag that cryptographically binds the image of the virtual instant lottery ticket to the identification;

a virtual coating key factory system separate and independent from the virtual instant ticket factory system, the virtual coating key factory system controlled by a lottery authority that is separate from the ticket provider, the virtual coating key factory system comprising a second processor and a second memory device that stores a second plurality of instructions that, when executed by the second processor, causes the second processor to: (a) provide an encryption key that is employed to encrypt the digital object to apply a virtual scratch-off-coating to the virtual instant lottery ticket and conceal variable indica of the image of the virtual instant lottery ticket, and (b) responsive to an authorized request that comprises the encrypted digital object, decrypt the encrypted digital object to remove the virtual scratch-off-coating from the virtual instant lottery ticket, wherein the virtual coating key factory is operable to remove the virtual scratch-off-coating from the virtual instant lottery ticket only one time to duplicate an effect of a removal of a scratch-off-coating of a physical instant lottery ticket that enables a display device of a lottery player device to display the variable indica of the virtual instant lottery ticket; and a lottery owner system separate and independent from the virtual instant ticket factory system and the virtual coating key factory system, the lottery owner system controlled by a lottery administrator separate from the virtual instant ticket factory system and separate from the virtual coating key factory system, the lottery owner system comprising a third processor and a third memory device that stores a third plurality of instructions that, when executed by the third processor, causes the third processor to: (i) receive a purchase request from the lottery player device requesting to purchase the virtual instant lottery ticket, (ii) issue the virtual instant lottery ticket to the lottery player device, (iii) receive a scratch off request for the virtual instant lottery ticket from the lottery player device, (iv) responsive to such scratch off request, operate with the virtual coating key factory system to remove the virtual scratch-off-coating from the virtual instant lottery ticket by providing the encrypted digital object to the lottery player device for generation of the authorized request, and (v) facilitate redemption of the virtual instant lottery ticket for an award associated with the virtual instant lottery ticket, wherein the virtual instant ticket factory system and the virtual coating key factory system are in communication with each other, and the virtual instant ticket factory system and the lottery owner system are in communication with each other, wherein the lottery player device is remote from each of the virtual instant ticket factory system, the virtual coating key factory system, and the lottery owner system.

14. The lottery ticket system of claim 13, wherein the third memory device of the lottery owner system stores a fourth plurality of instructions that, when executed by the third processor, causes the third processor to interface with a notary system, and for each request relating to the virtual instant lottery ticket, to send the digital object to the notary system to enable the notary system to apply a digital signature to the digital object, wherein the notary system comprises a fourth processor and a fourth memory device that stores a fifth plurality of instructions that, when executed by the fourth processor, causes the fourth processor to track and record via an append-only database all transactions involving the digital object by signing the digital object for each of the transactions, wherein the transactions comprise: (a) the sale of the virtual instant lottery ticket, (b) each transfer of the virtual instant lottery ticket, and (c) any start of the scratching of the scratch-off-coating of the virtual instant lottery ticket, wherein the notary system is controlled by an entity separate from the ticket provider, separate from the lottery authority, and separate from the lottery administrator, wherein the notary system is separate and independent from the virtual instant ticket factory system, the virtual coating key factory system, and the lottery owner system.

15. The lottery ticket system of claim 13, wherein the third memory device of the lottery owner system stores a fourth plurality of instructions that, when executed by the third processor, causes the third processor to apply a secret envelope to the encrypted digital object, comprising creating a multi-layered encrypted version of the virtual instant lottery ticket, and dividing information necessary to decrypt the encrypted digital object between different systems.

16. A lottery ticket system comprising:

a virtual instant ticket factory system comprising a first processor and a first memory device that stores a first plurality of instructions that, when executed by the first processor, causes the first processor to create a digital object representing a virtual instant lottery ticket for an instant lottery game based on a set of inputs, the virtual instant ticket factory system controlled by a ticket provider, the digital object comprising data representing an identification of the virtual instant lottery ticket and an image of the virtual instant lottery ticket in a format suitable for physical printing, wherein the image comprises a ticket virtual printing integrity tag that cryptographically binds the image of the virtual instant lottery ticket to the identification;

a virtual coating key factory system separate and independent from the virtual instant ticket factory system, the virtual coating key factory system controlled by a lottery authority that is separate from the ticket provider, the virtual coating key factory system comprising a second processor and a second memory device that stores a second plurality of instructions that, when executed by the second processor, causes the second processor to: (a) provide an encryption key that is employed to encrypt the digital object to apply a virtual scratch-off-coating to the virtual instant lottery ticket and conceal variable indica of the image of the virtual instant lottery ticket, (b) responsive to an authorized request that comprises the encrypted digital object, decrypt the encrypted digital object to remove the virtual scratch-off-coating from the virtual instant lottery ticket, and (c) remove the virtual scratch-off-coating from the virtual instant lottery ticket only one time to duplicate an effect of a removal of a scratch-off-coating of a physical instant lottery ticket that enables a display device of a lottery player device to display the variable indica of the virtual instant lottery ticket; and a lottery owner system separate and independent from the virtual instant ticket factory system and the virtual coating key factory system, the lottery owner system controlled by a lottery administrator separate from the virtual instant ticket factory system and separate from the virtual coating key factory system, and comprising a third processor and a third memory device that stores a third plurality of instructions that, when executed by the third processor, causes the third processor to: (a) receive a scratch off request for the encrypted digital object from the lottery player device, and (b) responsive to such scratch off request, operate with the virtual coating key factory system to remove the virtual scratch-off-coating from the virtual instant lottery ticket by providing the encrypted digital object to the lottery player device for generation of the authorized request, wherein the virtual instant ticket factory system and the virtual coating key factory system are in communication with each other, and the virtual instant ticket factory system and the lottery owner system are in communication with each other, wherein the lottery player device is remote from each of the virtual instant ticket factory system, the virtual coating key factory system, and the lottery owner system.

17. The lottery ticket system of claim 16, wherein the third memory device of the lottery owner system stores a fourth plurality of instructions that, when executed by the third processor, causes the third processor to interface with a notary system, and for each request relating to the virtual instant lottery ticket, to send the digital object to the notary system to enable the notary system to apply a digital signature to the digital object, wherein the notary system comprises a fourth processor and a fourth memory device that stores a fifth plurality of instructions that, when executed by the fourth processor, causes the fourth processor to track and record via an append-only database all transactions involving the digital object by signing the digital object for each transaction of the virtual instant lottery ticket including: (a) the sale of the virtual instant lottery ticket, (b) each transfer of the virtual instant lottery ticket, and (c) any start of the scratching of the scratch-off-coating of the virtual instant lottery ticket, wherein the notary system is controlled by an entity separate from the ticket provider, separate from the lottery authority, and separate from the lottery administrator, wherein the notary system is separate and independent from the virtual instant ticket factory system, the virtual coating key factory system, and the lottery owner system.

18. The lottery ticket system of claim 17, wherein the third memory device of the lottery owner system stores a sixth plurality of instructions that, when executed by the third processor, causes the third processor to apply a secret envelope to the encrypted digital object, comprising creating a multi-layered encrypted version of the virtual instant lottery ticket, and dividing information necessary to decrypt the encrypted digital object between different systems.

19. The lottery ticket system of claim 16, wherein the third memory device of the lottery owner system stores a fourth plurality of instructions that, when executed by the third processor, causes the third processor is operable to facilitate a redemption of the virtual instant lottery ticket for an award associated with the virtual instant lottery ticket.

* * * * *